(12) United States Patent
Wilkerson et al.

(10) Patent No.: US 10,229,060 B2
(45) Date of Patent: Mar. 12, 2019

(54) INSTRUCTION AND LOGIC FOR SOFTWARE HINTS TO IMPROVE HARDWARE PREFETCHER EFFECTIVENESS

(71) Applicant: Intel Corporation, Santa Clara, CA (US)

(72) Inventors: Christopher B. Wilkerson, Portland, OR (US); Ren Wang, Portland, OR (US); Namakkal N. Venkatesan, Hillsboro, OR (US); Patrick Lu, Mesa, AZ (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/369,594

(22) Filed: Dec. 5, 2016

(65) Prior Publication Data

US 2018/0157591 A1 Jun. 7, 2018

(51) Int. Cl.
*G06F 12/0862* (2016.01)

(52) U.S. Cl.
CPC .... *G06F 12/0862* (2013.01); *G06F 2212/602* (2013.01); *G06F 2212/6028* (2013.01)

(58) Field of Classification Search
CPC .... G06F 12/0862; G06F 2212/602–2212/6028
See application file for complete search history.

(56) References Cited

U.S. PATENT DOCUMENTS

| | | | |
|---|---|---|---|
| 3,898,624 A * | 8/1975 | Tobias | G06F 12/0862 711/118 |
| 5,941,981 A * | 8/1999 | Tran | G06F 9/383 711/137 |
| 9,378,021 B2 | 6/2016 | Chishti et al. | |
| 9,430,240 B1 * | 8/2016 | Atta | G06F 9/3851 |
| 2006/0179239 A1 * | 8/2006 | Fluhr | G06F 12/0862 711/137 |
| 2007/0094453 A1 * | 4/2007 | Santhanakrishnan | G06F 9/383 711/137 |
| 2010/0153653 A1 * | 6/2010 | El-Mahdy | G06F 12/0862 711/137 |
| 2011/0219208 A1 * | 9/2011 | Asaad | G06F 15/76 712/12 |
| 2012/0066455 A1 * | 3/2012 | Punyamurtula | G06F 12/0862 711/122 |
| 2013/0179663 A1 * | 7/2013 | Heisch | G06F 9/3802 712/207 |

(Continued)

OTHER PUBLICATIONS

Jimenez et al. "Making Data Prefetch Smarter: Adaptive Prefetching on POWER7." Sep. 2012. ACM. PACT'12. pp. 137-146.*

(Continued)

*Primary Examiner* — Nathan Sadler
(74) *Attorney, Agent, or Firm* — Womble Bond Dickinson (US) LLP

(57) ABSTRACT

Embodiments provide for a processor comprising a cache, a prefetcher to select information according to a prefetcher algorithm and to send the selected information to the cache, and a prefetch tuning buffer including tuning state for the set of candidate prefetcher algorithms, wherein the prefetcher is to adjust operation of the prefetcher algorithm based on the tuning state.

20 Claims, 24 Drawing Sheets

(56) References Cited

U.S. PATENT DOCUMENTS

| | | | | |
|---|---|---|---|---|
| 2013/0262793 | A1* | 10/2013 | Naethke | G06F 12/04 711/154 |
| 2014/0258641 | A1* | 9/2014 | Hooker | G06F 12/0862 711/137 |
| 2014/0310479 | A1* | 10/2014 | Hooker | G06F 12/0862 711/137 |
| 2015/0234663 | A1* | 8/2015 | Chishti | G06F 9/3808 712/207 |
| 2017/0161194 | A1* | 6/2017 | Loh | G06F 12/0862 |

OTHER PUBLICATIONS

Sparsh Mittal. "A Survey of Recent Prefetching Techniques for Processor Caches." Aug. 2016. ACM. ACM Computing Surveys. vol. 29. Article 35.*

IBM. Power ISA. Version 2.07. http://fileadmin.cs.lth.se/cs/education/EDAN25/PowerISA_V2.07_PUBLIC.pdf. pp. 103-107, 759-775.*

Lee et al., "When Prefetching Works, When It Doesn't, and Why" ACM Transactions on Architecture and Code Optimization, vol. 9, No. 1, Article 2, Mar. 2012, 29 pages.

* cited by examiner

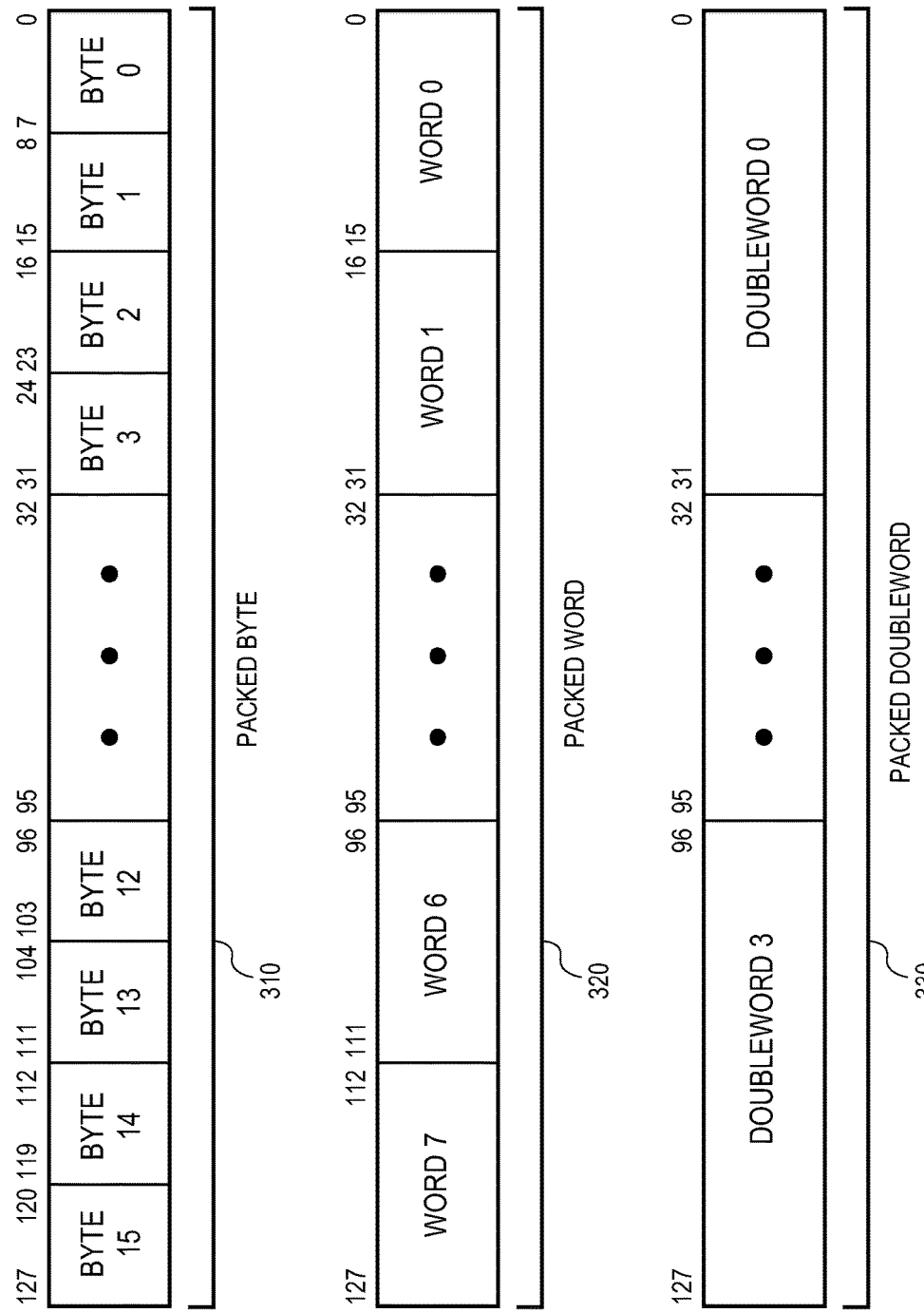

```
127      120 119    112 111    104 103              24 23      16 15      8 7        0
| bbbb bbbb | bbbb bbbb | bbbb bbbb |   •   •   •   | bbbb bbbb | bbbb bbbb | bbbb bbbb |
```
UNSIGNED PACKED BYTE REPRESENTATION 344

```
127      120 119    112 111    104 103              24 23      16 15      8 7        0
| sbbb bbbb | sbbb bbbb | sbbb bbbb |   •   •   •   | sbbb bbbb | sbbb bbbb | sbbb bbbb |
```
SIGNED PACKED BYTE REPRESENTATION 345

```
127                112 111                              16 15                        0
| wwww wwww wwww wwww |         •   •   •          | wwww wwww wwww wwww |
```
UNSIGNED PACKED WORD REPRESENTATION 346

```
127                112 111                              16 15                        0
| swww wwww wwww wwww |         •   •   •          | swww wwww wwww wwww |
```
SIGNED PACKED WORD REPRESENTATION 347

```
127                              92 91      32 31                                    0
| dddd dddd dddd dddd dddd dddd dddd dddd | • • • | dddd dddd dddd dddd dddd dddd dddd dddd |
```
UNSIGNED PACKED DOUBLEWORD REPRESENTATION 348

```
127                              92 91      32 31                                    0
| sddd dddd dddd dddd dddd dddd dddd dddd | • • • | sddd dddd dddd dddd dddd dddd dddd dddd |
```
SIGNED PACKED DOUBLEWORD REPRESENTATION 349

FIG. 3C

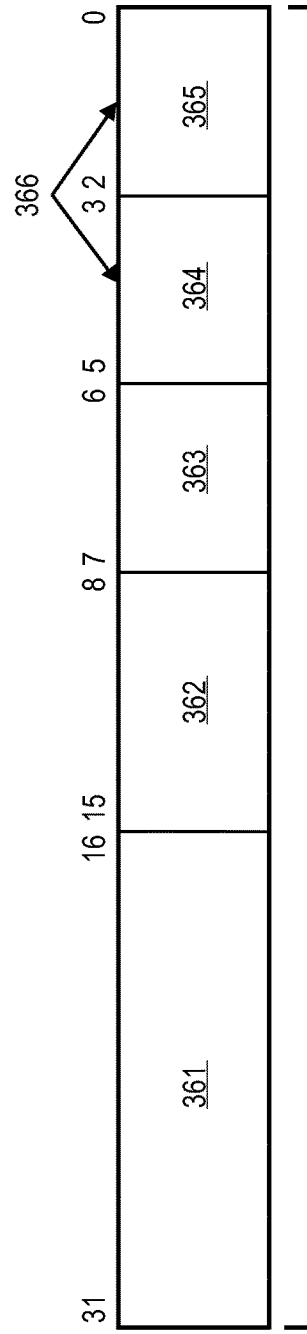
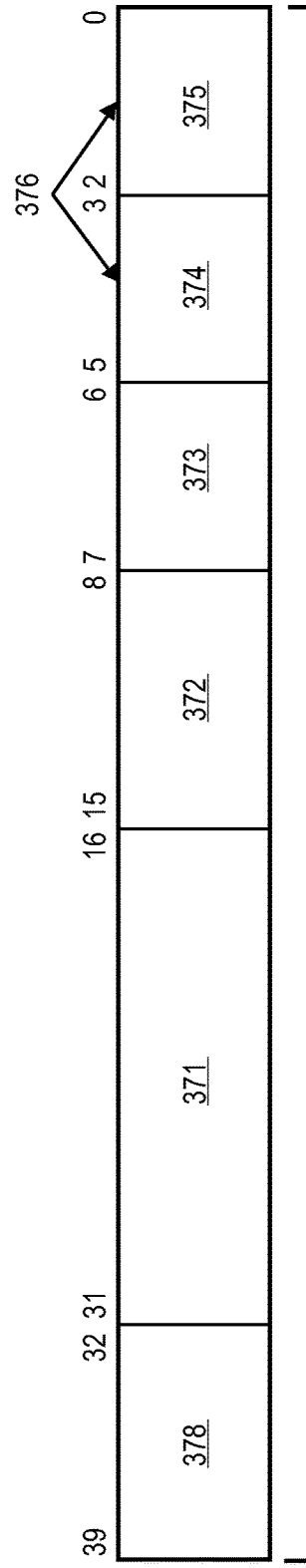
FIG. 3D
FIG. 3E

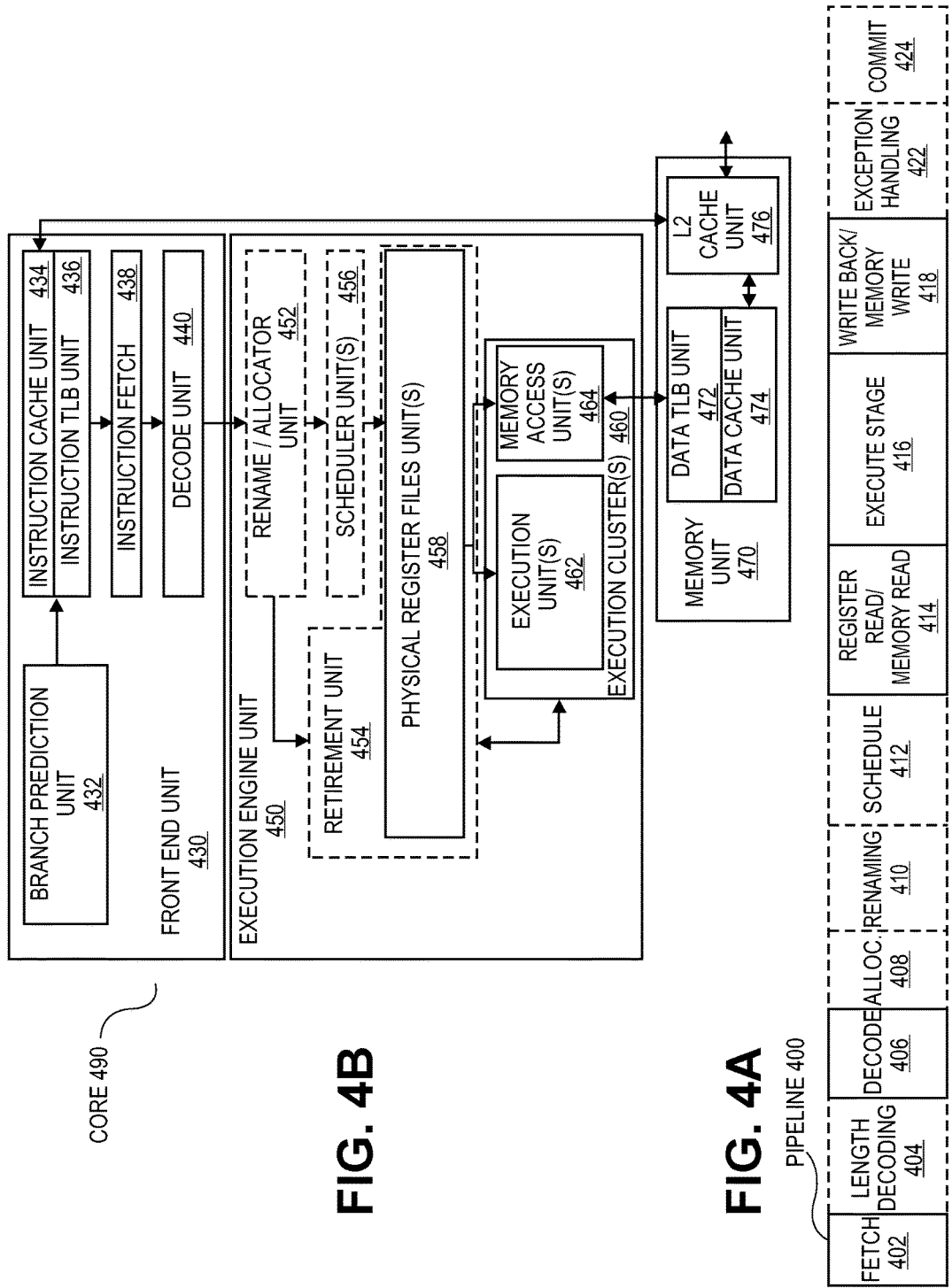

INSTRUCTION AND LOGIC FOR SOFTWARE HINTS TO IMPROVE HARDWARE PREFETCHER EFFECTIVENESS

FIELD OF THE INVENTION

The present disclosure pertains to the field of processing logic, microprocessors, and associated instruction set architecture that, when executed by the processor or other processing logic, perform logical, mathematical, or other functional operations. More specifically, the disclosure is related to a system and method in which a software hint is used to improve hardware prefetcher effectiveness.

DESCRIPTION OF RELATED ART

Prefetching plays an important role in tolerating memory access latencies and thus improving the performance. Processing devices can make use of a hardware prefetcher that is designed to prefetch data into cache, without software instructions, for in-time processing. However not all programs benefit from hardware prefetchers. For certain programs or certain portion of a program, a default hardware prefetcher would issue many useless and unnecessary prefetches due to the random access pattern in which the program accessed data. In such instance, the use of the hardware prefetcher can result in a scenario in which the majority of pre-fetched data is not accessed. In this scenario, the cache may be polluted with useless data, significantly reducing cache effectiveness. Additionally, the unnecessarily pre-fetched data can consume a significant amount of memory bandwidth. The effects described above can combine to negatively impact performance relative to a scenario in which hardware prefetching is disabled. Many efforts have been undertaken to predict runtime behavior and adjust the prefetching pattern accordingly. However, existing techniques are not always effective due to inaccurate predictions and/or prediction convergence latency.

DESCRIPTION OF THE FIGURES

Embodiments are illustrated by way of example and not limitation in the Figures of the accompanying drawings:

FIG. 3A illustrates packed data types according to one embodiment;

FIG. 3C illustrates packed data types according to one embodiment;

FIG. 3D illustrates an instruction encoding according to one embodiment;

FIG. 3E illustrates an instruction encoding according to one embodiment;

FIG. 4A illustrates elements of a processor micro-architecture according to one embodiment;

FIG. 4B illustrates elements of a processor micro-architecture according to one embodiment;

DETAILED DESCRIPTION

Figure 1A:
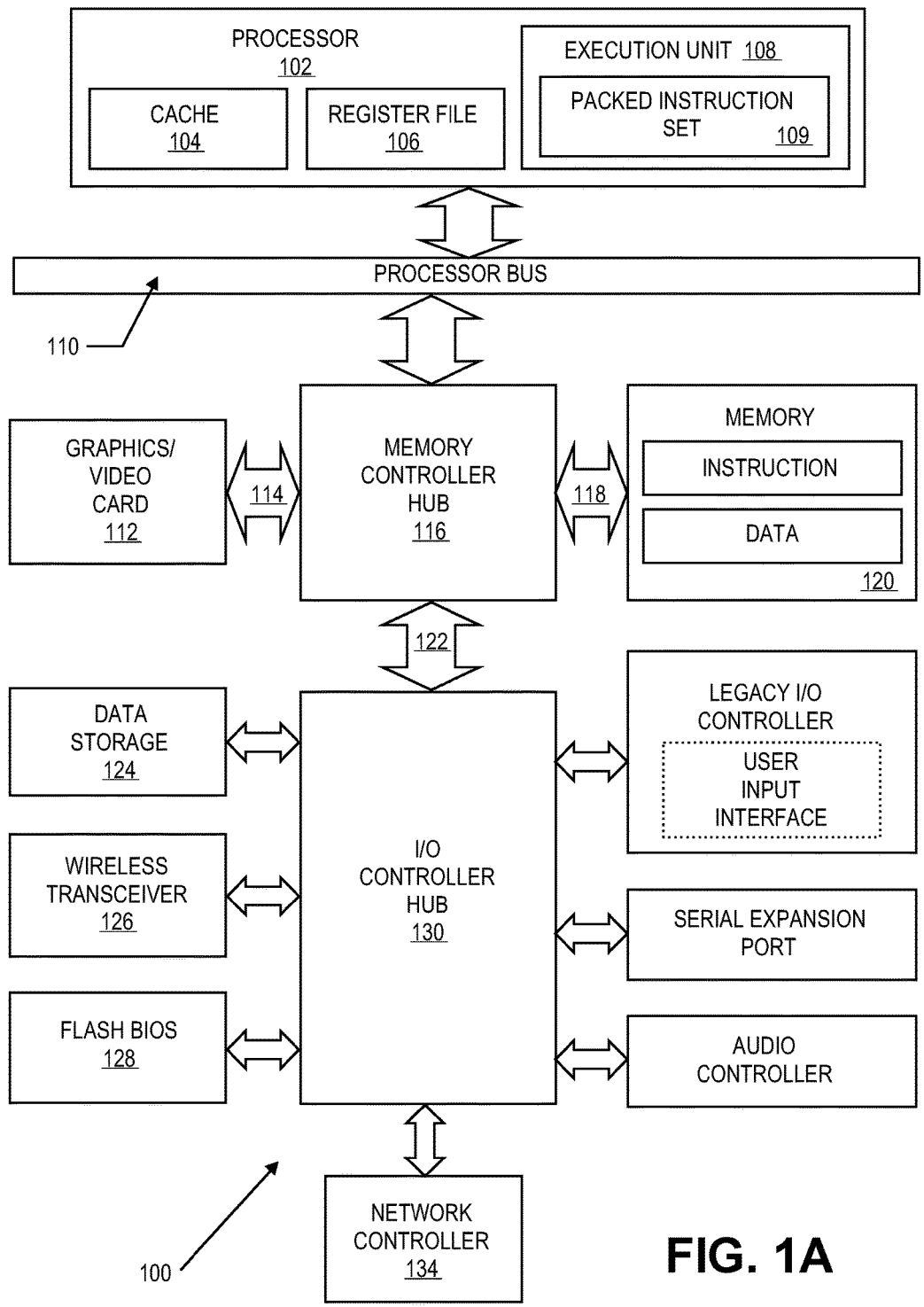
FIG. 1A is a block diagram of a system according to one embodiment.

The following description describes an instruction and processing logic for software hints to improve hardware prefetcher effectiveness within or in association with a processor, computer system, or other processing apparatus. In the following description, numerous specific details such as processing logic, processor types, micro-architectural conditions, events, enablement mechanisms, and the like are set forth in order to provide a more thorough understanding of the embodiments described herein. It will be appreciated, however, by one skilled in the art that the invention may be practiced without such specific details. Additionally, some well-known structures, circuits, and the like have not been shown in detail to avoid unnecessarily obscuring details of the various embodiments.

Although the following embodiments are described with reference to a processor, other embodiments are applicable to other types of integrated circuits and logic devices. Similar techniques and teachings can be applied to other types of circuits or semiconductor devices that can benefit from higher pipeline throughput and improved performance. The teachings of the embodiments are applicable to any processor or machine that performs data manipulations. However, the embodiments are not limited to processors or machines that perform 512-bit, 256-bit, 128-bit, 64-bit, 32-bit, or 16-bit data operations and can be applied to any processor and machine in which manipulation or management of data is performed. In addition, the following description provides examples, and the accompanying drawings show various examples for the purposes of illustration. However, these examples should not be construed in a limiting sense as they are merely intended to provide examples of embodiments rather than to provide an exhaustive list of all possible implementations of embodiments.

Although the below examples describe instruction handling and distribution in the context of execution units and logic circuits, other embodiments can be accomplished by way of a data or instructions stored on a machine-readable, tangible medium, which when performed by a machine cause the machine to perform functions consistent with at least one embodiment of the invention. In one embodiment, functions associated with embodiments are embodied in machine-executable instructions. The instructions can be used to cause a general-purpose or special-purpose processor that is programmed with the instructions to perform operations as described herein. Embodiments can be provided as a computer program product or software which may include a machine or computer-readable medium having stored thereon instructions which may be used to program a computer (or other electronic devices) to perform one or more operations according to embodiments described herein. Alternatively, operations can be performed by specific hardware components that contain fixed-function logic for performing the steps, or by any combination of programmed computer components and fixed-function hardware components. Instructions used to program logic to perform embodiments of the invention can be stored within a memory in the system, such as DRAM, cache, flash memory, or other storage. Furthermore, the instructions can be distributed via a network or by way of other computer readable media.

In modern processors, a number of different execution units are used to process and execute a variety of code and instructions. Not all instructions are created equal as some are quicker to complete while others can take a number of clock cycles to complete. The faster the throughput of instructions, the better the overall performance of the processor. Thus it would be advantageous to have as many instructions execute as fast as possible. However, there are certain instructions that have greater complexity and require more in terms of execution time and processor resources. For example, there are floating point instructions, load/store operations, data moves, etc.

As more computer systems are used in Internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In one embodiment, the instruction set architecture (ISA) may be implemented by one or more micro-architectures, which includes processor logic and circuits used to implement one or more instruction sets. Accordingly, processors with different micro-architectures can share at least a portion of a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT), a Reorder Buffer (ROB) and a retirement register file. In one embodiment, registers may include one or more registers, register architectures, register files, or other register sets that may or may not be addressable by a software programmer.

In one embodiment, an instruction may include one or more instruction formats. In one embodiment, an instruction format may indicate various fields (number of bits, location of bits, etc.) to specify, among other things, the operation to be performed and the operand(s) on which that operation is to be performed. Some instruction formats may be further broken defined by instruction templates (or sub formats). For example, the instruction templates of a given instruction format may be defined to have different subsets of the instruction format's fields and/or defined to have a given field interpreted differently. In one embodiment, an instruction is expressed using an instruction format (and, if defined, in a given one of the instruction templates of that instruction format) and specifies or indicates the operation and the operands upon which the operation will operate.

Scientific, financial, auto-vectorized general purpose, RMS (recognition, mining, and synthesis), and visual and multimedia applications (e.g., 2D/3D graphics, image processing, video compression/decompression, voice recognition algorithms and audio manipulation) may require the same operation to be performed on a large number of data items. In one embodiment, Single Instruction Multiple Data (SIMD) refers to a type of instruction that causes a processor to perform an operation on multiple data elements. SIMD technology may be used in processors that can logically divide the bits in a register into a number of fixed-sized or variable-sized data elements, each of which represents a separate value. For example, in one embodiment, the bits in a 64-bit register may be organized as a source operand containing four separate 16-bit data elements, each of which represents a separate 16-bit value. This type of data may be referred to as 'packed' data type or 'vector' data type, and operands of this data type are referred to as packed data operands or vector operands. In one embodiment, a packed data item or vector may be a sequence of packed data elements stored within a single register, and a packed data operand or a vector operand may a source or destination operand of a SIMD instruction (or 'packed data instruction' or a 'vector instruction'). In one embodiment, a SIMD instruction specifies a single vector operation to be performed on two source vector operands to generate a destination vector operand (also referred to as a result vector operand) of the same or different size, with the same or different number of data elements, and in the same or different data element order.

SIMD technology, such as that employed by the Intel® Core™ processors having an instruction set including x8, MMX™, Streaming SIMD Extensions (SSE), SSE2, SSE3, SSE4.1, and SSE4.2 instructions, ARM processors, such as the ARM Cortex® family of processors having an instruction set including the Vector Floating Point (VFP) and/or NEON instructions, and MIPS processors, such as the Loongson family of processors developed by the Institute of Computing Technology (ICT) of the Chinese Academy of Sciences, has enabled a significant improvement in application performance (Core™ and MMX™ are registered trademarks or trademarks of Intel Corporation of Santa Clara, Calif.).

In one embodiment, destination and source registers/data are generic terms to represent the source and destination of the corresponding data or operation. In some embodiments, they may be implemented by registers, memory, or other storage areas having other names or functions than those depicted. For example, in one embodiment, "DEST1" may be a temporary storage register or other storage area, whereas "SRC1" and "SRC2" may be a first and second source storage register or other storage area, and so forth. In other embodiments, two or more of the SRC and DEST storage areas may correspond to different data storage elements within the same storage area (e.g., a SIMD register). In one embodiment, one of the source registers may also act as a destination register by, for example, writing back the result of an operation performed on the first and second source data to one of the two source registers serving as a destination registers.

FIG. 1A is a block diagram of an exemplary computer system formed with a processor that includes execution units to execute an instruction in accordance with an embodiment described herein. System 100 includes a component, such as a processor 102 to employ execution units including logic to perform algorithms for processing data, such as in the embodiment described herein. System 100 is representative of processing systems based on the PENTIUM, CORE, Xeon, and/or Atom microprocessors available from Intel Corporation of Santa Clara, Calif., although other systems (including PCs having other microprocessors, engineering workstations, set-top boxes and the like) may also be used. In one embodiment, sample system 100 may execute a version of the WINDOWS™ operating system available from Microsoft Corporation of Redmond, Wash., although other operating systems (UNIX and Linux for example), embedded software, and/or graphical user interfaces, may also be used. Thus, embodiments are not limited to any specific combination of hardware circuitry and software.

Embodiments are not limited to computer systems. Alternative embodiments can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

FIG. 1A is a block diagram of a computer system 100 formed with a processor 102 that includes one or more execution units 108 to perform an algorithm to perform at least one instruction, according to an embodiment. One embodiment may be described in the context of a single processor desktop or server system, but alternative embodiments can be included in a multiprocessor system. System 100 is an example of a 'hub' system architecture. The computer system 100 includes a processor 102 to process data signals. The processor 102 can be a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 102 is coupled to a processor bus 110 that can transmit data signals between the processor 102 and other components in the system 100. The elements of system 100 perform their conventional functions that are well known to those familiar with the art.

In one embodiment, the processor 102 includes a Level 1 (L1) internal cache memory 104. Depending on the architecture, the processor 102 can have a single internal cache or multiple levels of internal cache. Alternatively, in another embodiment, the cache memory can reside external to the processor 102. Other embodiments can also include a combination of both internal and external caches depending on the particular implementation and needs. Register file 106 can store different types of data in various registers including integer registers, floating point registers, status registers, and instruction pointer register.

Execution unit 108, including logic to perform integer and floating point operations, also resides in the processor 102. The processor 102 also includes a microcode (ucode) ROM that stores microcode for certain macroinstructions. For one embodiment, execution unit 108 includes logic to handle a packed instruction set 109. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications can be accelerated and executed more efficiently by using the full width of a processor's data bus for performing operations on packed data. This can eliminate the need to transfer smaller units of data across the processor's data bus to perform one or more operations one data element at a time.

Alternate embodiments of an execution unit 108 can also be used in micro controllers, embedded processors, graphics devices, DSPs, and other types of logic circuits. System 100 includes a memory 120. Memory 120 can be a dynamic random access memory (DRAM) device, a static random access memory (SRAM) device, flash memory device, or other memory device. Memory 120 can store instructions and/or data represented by data signals that can be executed by the processor 102.

In one embodiment a memory controller hub (MCH) 116 is coupled to the processor bus 110 and memory 120. The processor 102 can communicate to the MCH 116 via a processor bus 110. The MCH 116 is a system logic chip that provides a high bandwidth memory path 118 to memory 120 for instruction and data storage and for storage of graphics commands, data and textures. The MCH 116 is to direct data signals between the processor 102, memory 120, and other components in the system 100 and to bridge the data signals between processor bus 110, memory 120, and system I/O 122. In some embodiments, the system logic chip 116 can provide a graphics port for coupling to a graphics controller 112. The MCH 116 is coupled to memory 120 through a memory interface 118. The graphics card 112 is coupled to the MCH 116 through an Accelerated Graphics Port (AGP) interconnect 114.

In some embodiments the system I/O 122 is a proprietary hub interface bus that is used to couple the MCH 116 to the I/O controller hub (ICH) 130. The ICH 130 provides direct connections to some I/O devices via a local I/O bus. The local I/O bus is a high-speed I/O bus for connecting peripherals to the memory 120, chipset, and processor 102. Some examples are the audio controller, firmware hub (flash BIOS) 128, wireless transceiver 126, data storage 124, legacy I/O controller containing user input and keyboard interfaces, a serial expansion port such as Universal Serial Bus (USB), and a network controller 134. The data storage device 124 can comprise a hard disk drive, a floppy disk drive, a CD-ROM device, a flash memory device, or other mass storage device.

For another embodiment of a system, an instruction in accordance with one embodiment can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

Figure 1B:
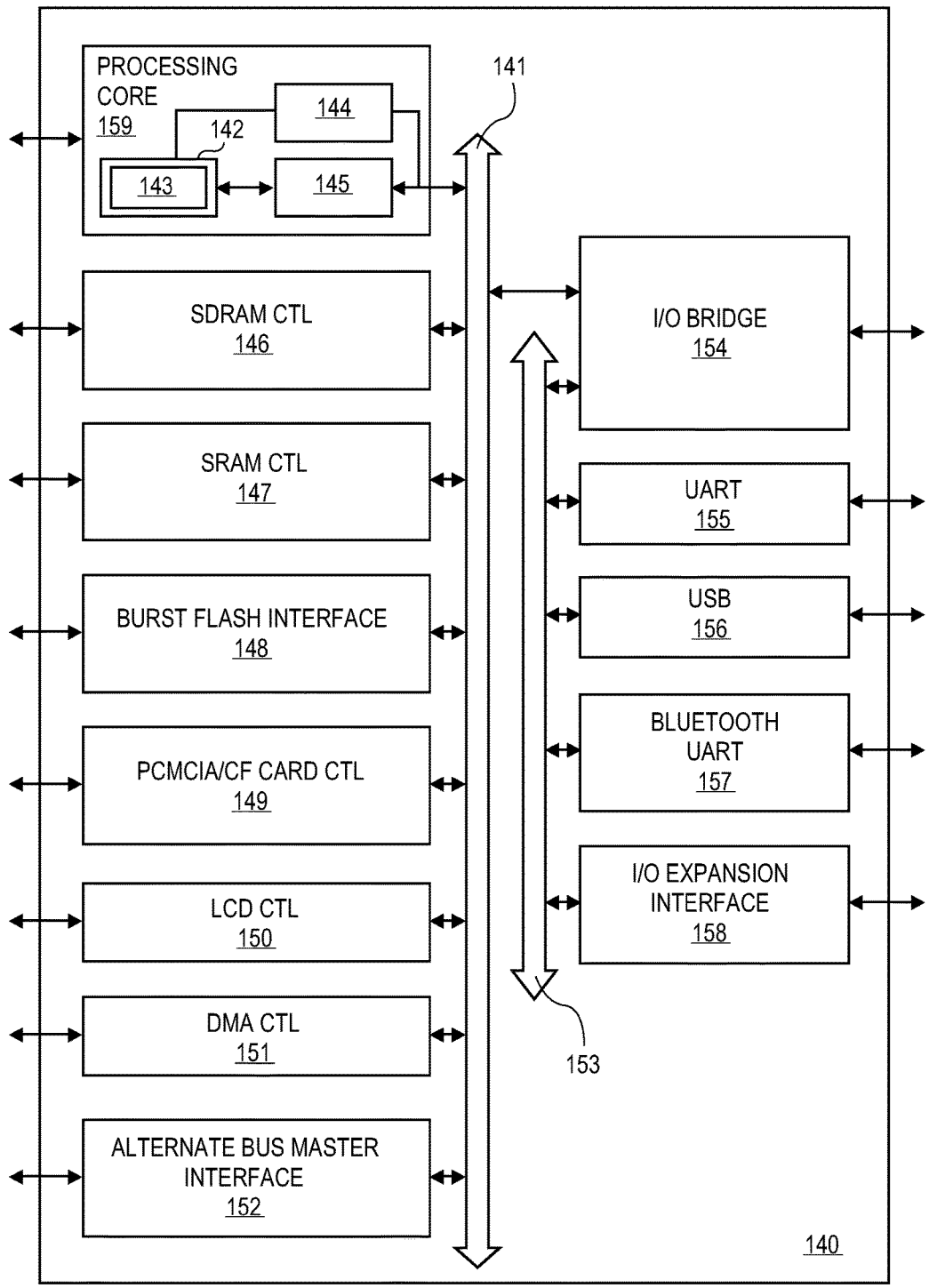
FIG. 1B is a block diagram of a system according to one embodiment.

FIG. 1B illustrates a data processing system 140 which implements the principles of one embodiment. It will be readily appreciated by one of skill in the art that the embodiments described herein can be used with alternative processing systems without departure from the scope of embodiments of the invention.

The data processing system 140 comprises a processing core 159 capable of performing at least one instruction in accordance with one embodiment. For one embodiment, processing core 159 represents a processing unit of any type of architecture, including but not limited to CISC, RISC or VLIW type architecture. Processing core 159 may also be suitable for manufacture in one or more process technologies and by being represented on a machine readable media in sufficient detail, may be suitable to facilitate said manufacture.

Processing core 159 comprises an execution unit 142, a set of register file(s) 145, and a decoder 144. Processing core 159 also includes additional circuitry (not shown) which is not necessary to the understanding of the various embodiments. Execution unit 142 is used for executing instructions received by processing core 159. In addition to performing typical processor instructions, execution unit 142 can perform instructions in packed instruction set 143 for performing operations on packed data formats. Packed instruction set 143 includes instructions for performing embodiments of the invention and other packed instructions. Execution unit 142 is coupled to register file 145 by an internal bus. Register file 145 represents a storage area on processing core 159 for storing information, including data. As previously mentioned, it is understood that the storage area used for storing the packed data is not critical. Execution unit 142 is coupled to decoder 144. Decoder 144 is used for decoding instructions received by processing core 159 into control signals and/or microcode entry points. In response to these control signals and/or microcode entry points, execution unit 142 performs the appropriate operations. In one embodiment, the decoder is used to interpret the opcode of the instruction, which will indicate what operation should be performed on the corresponding data indicated within the instruction.

Processing core 159 is coupled with bus 141 for communicating with various other system devices, which may include but are not limited to, for example, synchronous dynamic random access memory (SDRAM) control 146, static random access memory (SRAM) control 147, burst flash memory interface 148, personal computer memory card international association (PCMCIA)/compact flash (CF) card control 149, liquid crystal display (LCD) control 150, direct memory access (DMA) controller 151, and alternative bus master interface 152. In one embodiment, data processing system 140 may also comprise an I/O bridge 154 for communicating with various I/O devices via an I/O bus 153. Such I/O devices may include but are not limited to, for example, universal asynchronous receiver/transmitter (UART) 155, universal serial bus (USB) 156, Bluetooth wireless UART 157 and I/O expansion interface 158.

One embodiment of data processing system 140 provides for mobile, network and/or wireless communications and a processing core 159 capable of performing SIMD operations including a text string comparison operation. Processing core 159 may be programmed with various audio, video, imaging and communications algorithms including discrete transformations such as a Walsh-Hadamard transform, a fast Fourier transform (FFT), a discrete cosine transform (DCT), and their respective inverse transforms; compression/decompression techniques such as color space transformation, video encode motion estimation or video decode motion compensation; and modulation/demodulation (MODEM) functions such as pulse coded modulation (PCM).

Figure 1C:
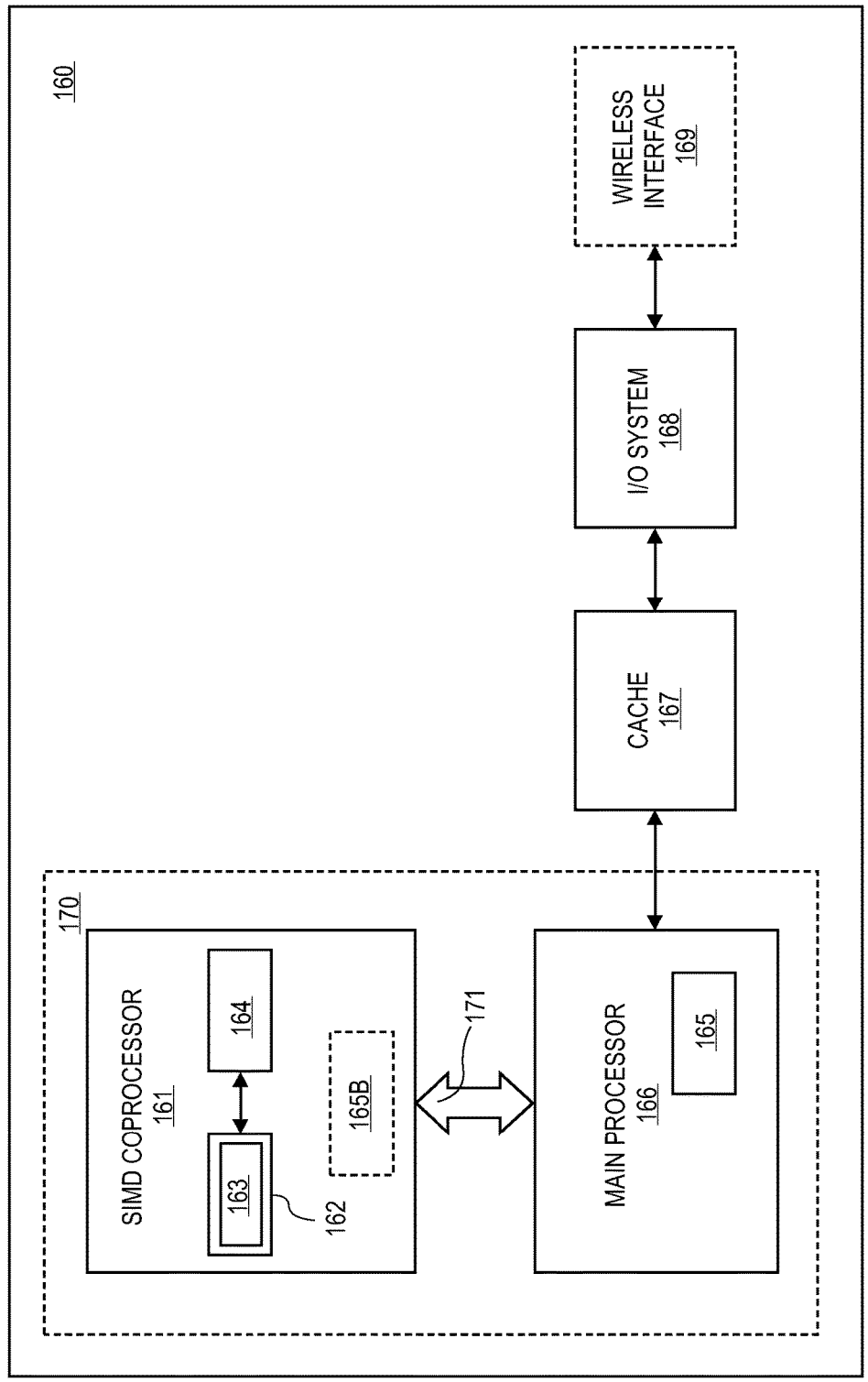
FIG. 1C is a block diagram of a system according to one embodiment.

FIG. 1C illustrates yet alternative embodiments of a data processing system capable of performing SIMD text string comparison operations. In accordance with one alternative embodiment, data processing system 160 may include a main processor 166, a SIMD coprocessor 161, a cache memory 167, and an input/output system 168. The input/output system 168 may optionally be coupled to a wireless interface 169. SIMD coprocessor 161 is capable of performing operations including instructions in accordance with one embodiment. Processing core 170 may be suitable for manufacture in one or more process technologies and by being represented on a machine readable media in sufficient detail, may be suitable to facilitate the manufacture of all or part of data processing system 160 including processing core 170.

For one embodiment, SIMD coprocessor 161 comprises an execution unit 162 and a set of register file(s) 164. One embodiment of main processor 166 comprises a decoder 165 to recognize instructions of instruction set 163 including instructions in accordance with one embodiment for execution by execution unit 162. For alternative embodiments, SIMD coprocessor 161 also comprises at least part of decoder 165B to decode instructions of instruction set 163. Processing core 170 also includes additional circuitry (not shown) which is not necessary to the understanding of the embodiments described herein.

In operation, the main processor 166 executes a stream of data processing instructions that control data processing operations of a general type including interactions with the cache memory 167, and the input/output system 168. Embedded within the stream of data processing instructions are SIMD coprocessor instructions. The decoder 165 of main processor 166 recognizes these SIMD coprocessor instructions as being of a type that should be executed by an attached SIMD coprocessor 161. Accordingly, the main processor 166 issues these SIMD coprocessor instructions (or control signals representing SIMD coprocessor instructions) on the coprocessor bus 171 where from they are received by any attached SIMD coprocessors. In this case, the SIMD coprocessor 161 will accept and execute any received SIMD coprocessor instructions intended for it.

Data may be received via wireless interface 169 for processing by the SIMD coprocessor instructions. For one example, voice communication may be received in the form of a digital signal, which may be processed by the SIMD coprocessor instructions to regenerate digital audio samples representative of the voice communications. For another example, compressed audio and/or video may be received in the form of a digital bit stream, which may be processed by the SIMD coprocessor instructions to regenerate digital audio samples and/or motion video frames. For one embodiment of processing core 170, main processor 166, and a SIMD coprocessor 161 are integrated into a single processing core 170 comprising an execution unit 162, a set of register file(s) 164, and a decoder 165 to recognize instructions of instruction set 163 including instructions in accordance with one embodiment.

Figure 2:
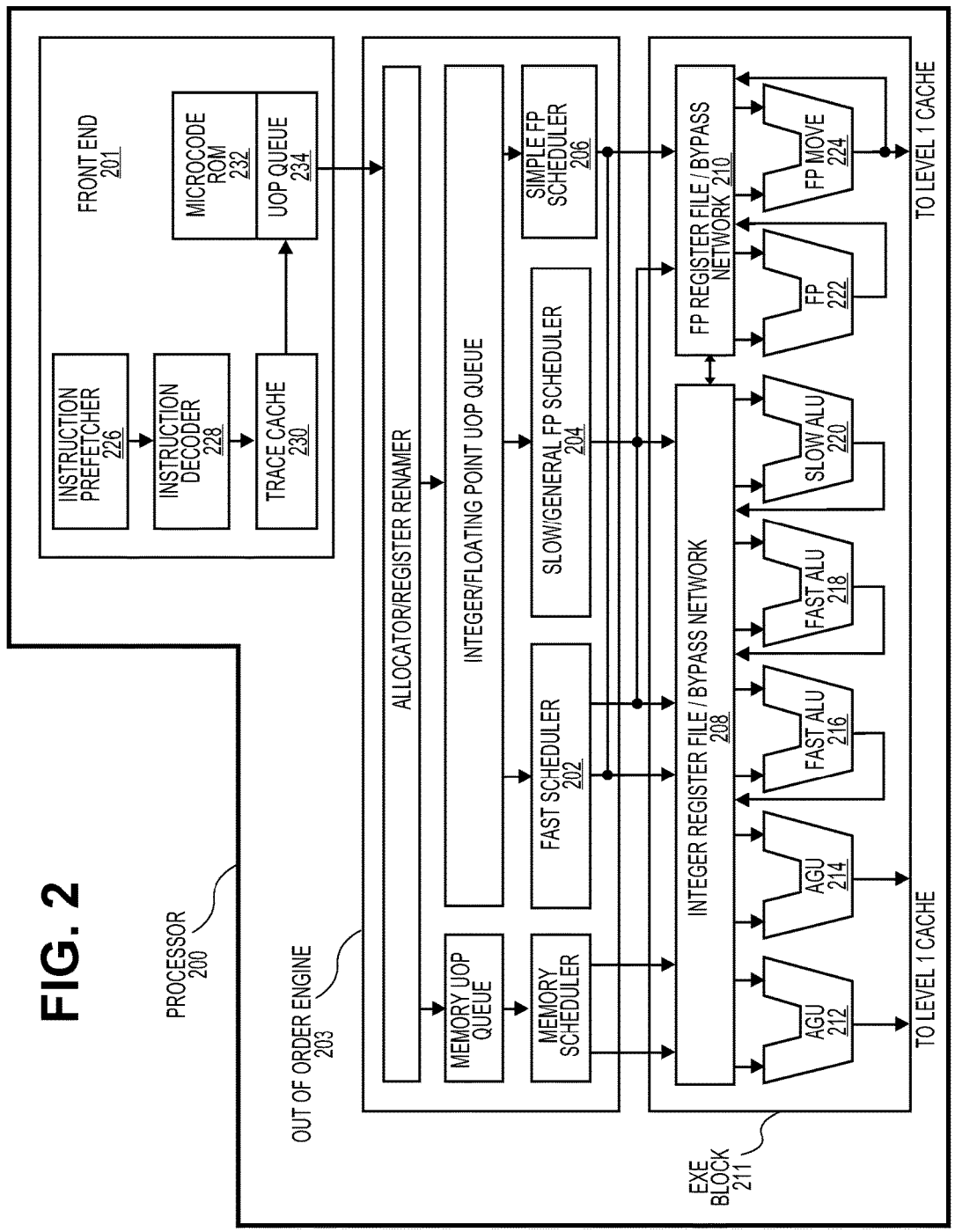
FIG. 2 is a block diagram of a processor according to one embodiment.

FIG. 2 is a block diagram of the micro-architecture for a processor 200 that includes logic circuits to perform instructions, according to an embodiment. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 201 is the part of the processor 200 that fetches instructions to be executed and prepares them to be used later in the processor pipeline. The front end 201 may include several units. In one embodiment, the instruction prefetcher 226 fetches instructions from memory and feeds them to an instruction decoder 228 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 230 takes decoded uops and assembles them into program ordered sequences or traces in the uop queue 234 for execution. When the trace cache 230 encounters a complex instruction, the microcode ROM 232 provides the uops needed to complete the operation.

Some instructions are converted into a single micro-op, whereas others need several micro-ops to complete the full operation. In one embodiment, if more than four micro-ops are needed to complete a instruction, the decoder 228 accesses the microcode ROM 232 to do the instruction. For one embodiment, an instruction can be decoded into a small number of micro ops for processing at the instruction decoder 228. In another embodiment, an instruction can be stored within the microcode ROM 232 should a number of micro-ops be needed to accomplish the operation. The trace cache 230 refers to a entry point programmable logic array (PLA) to determine a correct micro-instruction pointer for reading the micro-code sequences to complete one or more instructions in accordance with one embodiment from the micro-code ROM 232. After the microcode ROM 232 finishes sequencing micro-ops for an instruction, the front end 201 of the machine resumes fetching micro-ops from the trace cache 230.

The out-of-order execution engine 203 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 202, slow/general floating point scheduler 204, and simple floating point scheduler 206. The uop schedulers 202, 204, 206, determine when a uop is ready to execute based on the readiness of their dependent input register operand sources and the availability of the execution resources the uops need to complete their operation. The fast scheduler 202 of one embodiment can schedule on each half of the main clock cycle while the other schedulers can only schedule once per main processor clock cycle. The schedulers arbitrate for the dispatch ports to schedule uops for execution.

Register files 208, 210, sit between the schedulers 202, 204, 206, and the execution units 212, 214, 216, 218, 220, 222, 224 in the execution block 211. There is a separate register file 208, 210, for integer and floating point operations, respectively. Each register file 208, 210, of one embodiment also includes a bypass network that can bypass or forward just completed results that have not yet been written into the register file to new dependent uops. The integer register file 208 and the floating point register file 210 are also capable of communicating data with the other. For one embodiment, the integer register file 208 is split into two separate register files, one register file for the low order 32 bits of data and a second register file for the high order 32 bits of data. The floating point register file 210 of one embodiment has 128-bit wide entries because floating point instructions typically have operands from 64 to 128 bits in width.

The execution block 211 contains the execution units 212, 214, 216, 218, 220, 222, 224, where the instructions are actually executed. This section includes the register files 208, 210, that store the integer and floating point data operand values that the micro-instructions need to execute. The processor 200 of one embodiment is comprised of a number of execution units: address generation unit (AGU) 212, AGU 214, fast ALU 216, fast ALU 218, slow ALU 220, floating point ALU 222, floating point move unit 224. For one embodiment, the floating point execution blocks 222, 224, execute floating point, MMX, SIMD, and SSE, or other operations. The floating point ALU 222 of one embodiment includes a 64 bit by 64 bit floating point divider to execute divide, square root, and remainder micro-ops. Instructions involving a floating point value may be handled with the floating point hardware. In one embodiment, the ALU operations go to the high-speed ALU execution units 216, 218. The fast ALUs 216, 218, of one embodiment can execute fast operations with an effective latency of half a clock cycle. For one embodiment, most complex integer operations go to the slow ALU 220 as the slow ALU 220 includes integer execution hardware for long latency type of operations, such as a multiplier, shifts, flag logic, and branch processing. Memory load/store operations are executed by the AGUs 212, 214. For one embodiment, the integer ALUs 216, 218, 220, are described in the context of performing integer operations on 64 bit data operands. In alternative embodiments, the ALUs 216, 218, 220, can be implemented to support a variety of data bits including 16, 32, 128, 256, etc. Similarly, the floating point units 222, 224, can be implemented to support a range of operands having bits of various widths. For one embodiment, the floating point units 222, 224, can operate on 128-bit wide packed data operands in conjunction with SIMD and multimedia instructions.

In one embodiment, the uops schedulers 202, 204, 206, dispatch dependent operations before the parent load has finished executing. As uops are speculatively scheduled and executed in processor 200, the processor 200 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data. For the discussions below, the registers are understood to be data registers designed to hold packed data, such as 64-bit wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128-bit wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

In the examples of the following figures, a number of data operands are described. FIG. 3A illustrates various packed data type representations in multimedia registers, according to an embodiment. FIG. 3A illustrates data types for a packed byte 310, a packed word 320, and a packed doubleword (dword) 330 for 128-bit wide operands. The packed byte format 310 of this example is 128 bits long and contains sixteen packed byte data elements. A byte is defined here as 8 bits of data. Information for each byte data element is stored in bit 7 through bit 0 for byte 0, bit 15 through bit 8 for byte 1, bit 23 through bit 16 for byte 2, and finally bit 120 through bit 127 for byte 15. Thus, all available bits are used in the register. This storage arrangement increases the storage efficiency of the processor. As well, with sixteen data elements accessed, one operation can now be performed on sixteen data elements in parallel.

Generally, a data element is an individual piece of data that is stored in a single register or memory location with other data elements of the same length. In packed data sequences relating to SSEx technology, the number of data elements stored in a XMM register is 128 bits divided by the length in bits of an individual data element. Similarly, in packed data sequences relating to MMX and SSE technology, the number of data elements stored in an MMX register is 64 bits divided by the length in bits of an individual data element. Although the data types illustrated in FIG. 3A are 128 bits long, embodiments are provided that also operate with 64 bit wide or other sized operands. The packed word format 320 of this example is 128 bits long and contains eight packed word data elements. Each packed word contains sixteen bits of information. The packed doubleword format 330 of FIG. 3A is 128 bits long and contains four packed doubleword data elements. Each packed doubleword data element contains thirty two bits of information. A packed quadword is 128 bits long and contains two packed quad-word data elements.

Figure 3B:
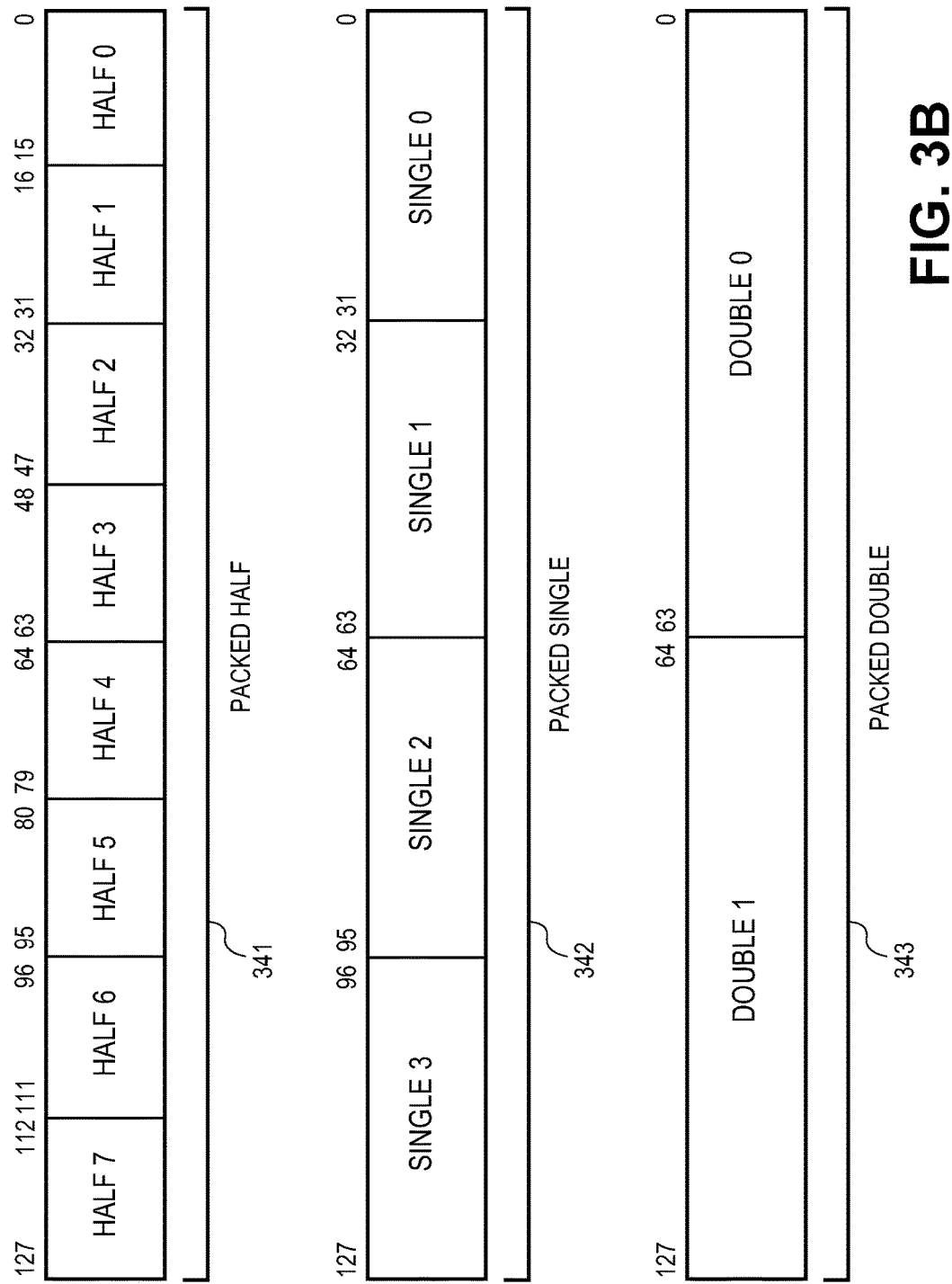
FIG. 3B illustrates packed data types according one embodiment.

FIG. 3B illustrates alternative in-register data storage formats. Each packed data can include more than one independent data element. Three packed data formats are illustrated; packed half 341, packed single 342, and packed double 343. One embodiment of packed half 341, packed single 342, and packed double 343 contain fixed-point data elements. For an alternative embodiment one or more of packed half 341, packed single 342, and packed double 343 may contain floating-point data elements. One alternative embodiment of packed half 341 is one hundred twenty-eight bits long containing eight 16-bit data elements. One embodiment of packed single 342 is one hundred twenty-eight bits long and contains four 32-bit data elements. One embodiment of packed double 343 is one hundred twenty-eight bits long and contains two 64-bit data elements. It will be appreciated that such packed data formats may be further extended to other register lengths, for example, to 96-bits, 160-bits, 192-bits, 224-bits, 256-bits or more.

FIG. 3C illustrates various signed and unsigned packed data type representations in multimedia registers, according to an embodiment. Unsigned packed byte representation 344 illustrates the storage of an unsigned packed byte in a SIMD register. Information for each byte data element is stored in bit seven through bit zero for byte zero, bit fifteen through bit eight for byte one, bit twenty-three through bit sixteen for byte two, and finally bit one hundred twenty through bit one hundred twenty-seven for byte fifteen. Thus, all available bits are used in the register. This storage arrangement can increase the storage efficiency of the processor. As well, with sixteen data elements accessed, one operation can now be performed on sixteen data elements in a parallel fashion. Signed packed byte representation 345 illustrates the storage of a signed packed byte. Note that the eighth bit of every byte data element is the sign indicator. Unsigned packed word representation 346 illustrates how word seven through word zero are stored in a SIMD register. Signed packed word representation 347 is similar to the unsigned packed word in-register representation 346. Note that the sixteenth bit of each word data element is the sign indicator. Unsigned packed doubleword representation 348 shows how doubleword data elements are stored. Signed packed doubleword representation 349 is similar to unsigned packed doubleword in-register representation 348. Note that the necessary sign bit is the thirty-second bit of each doubleword data element.

FIG. 3D is a depiction of one embodiment of an operation encoding (opcode) format 360, having thirty-two or more bits, and register/memory operand addressing modes corresponding with a type of opcode format described in the "IA-32 Intel Architecture Software Developer's Manual Volume 2: Instruction Set Reference," which is which is available from Intel Corporation, Santa Clara, Calif. on the world-wide-web (www) at intel.com/design/litcentr. In one embodiment, and instruction may be encoded by one or more of fields 361 and 362. Up to two operand locations per instruction may be identified, including up to two source operand identifiers 364 and 365. For one embodiment, destination operand identifier 366 is the same as source operand identifier 364, whereas in other embodiments they are different. For an alternative embodiment, destination operand identifier 366 is the same as source operand identifier 365, whereas in other embodiments they are different. In one embodiment, one of the source operands identified by source operand identifiers 364 and 365 is overwritten by the results of the text string comparison operations, whereas in other embodiments identifier 364 corresponds to a source register element and identifier 365 corresponds to a destination register element. For one embodiment, operand identifiers 364 and 365 may be used to identify 32-bit or 64-bit source and destination operands.

FIG. 3E is a depiction of another alternative operation encoding (opcode) format 370, having forty or more bits. Opcode format 370 corresponds with opcode format 360 and comprises an optional prefix byte 378. An instruction according to one embodiment may be encoded by one or more of fields 378, 371, and 372. Up to two operand locations per instruction may be identified by source operand identifiers 374 and 375 and by prefix byte 378. For one embodiment, prefix byte 378 may be used to identify 32-bit or 64-bit source and destination operands. For one embodiment, destination operand identifier 376 is the same as source operand identifier 374, whereas in other embodiments they are different. For an alternative embodiment, destination operand identifier 376 is the same as source operand identifier 375, whereas in other embodiments they are different. In one embodiment, an instruction operates on one or more of the operands identified by operand identifiers 374 and 375 and one or more operands identified by the operand identifiers 374 and 375 is overwritten by the results of the instruction, whereas in other embodiments, operands identified by identifiers 374 and 375 are written to another data element in another register. Opcode formats 360 and 370 allow register to register, memory to register, register by memory, register by register, register by immediate, register to memory addressing specified in part by MOD fields 363 and 373 and by optional scale-index-base and displacement bytes.

Figure 3F:
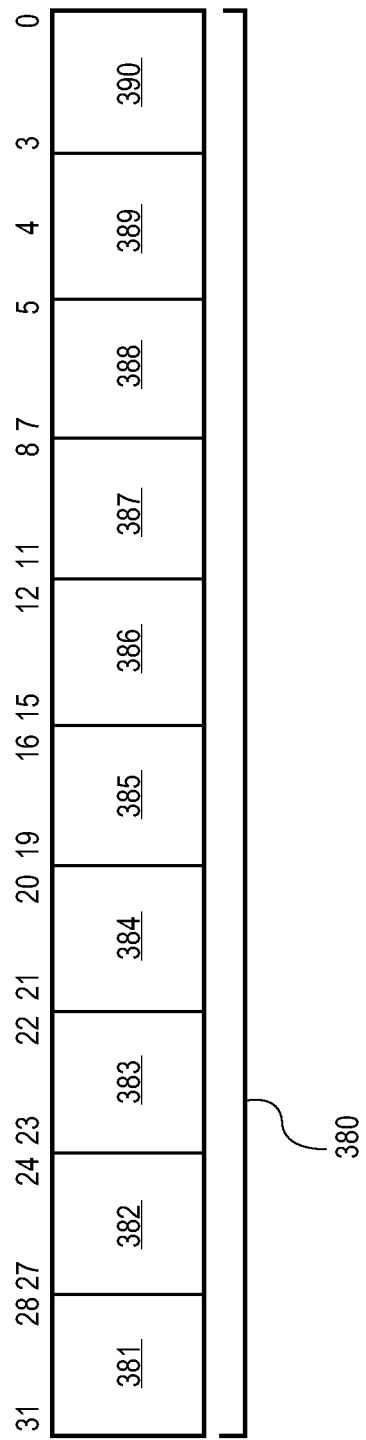
FIG. 3F illustrates an instruction encoding according to one embodiment.

Turning next to FIG. 3F, in some alternative embodiments, 64 bit single instruction multiple data (SIMD) arithmetic operations may be performed through a coprocessor data processing (CDP) instruction. Operation encoding (opcode) format 380 depicts one such CDP instruction having CDP opcode fields 382 and 389. The type of CDP instruction, for alternative embodiments, operations may be encoded by one or more of fields 383, 384, 387, and 388. Up to three operand locations per instruction may be identified, including up to two source operand identifiers 385 and 390 and one destination operand identifier 386. One embodiment of the coprocessor can operate on 8, 16, 32, and 64 bit values. For one embodiment, an instruction is performed on integer data elements. In some embodiments, an instruction may be executed conditionally, using condition field 381. For some embodiments, source data sizes may be encoded by field 383. In some embodiments, Zero (Z), negative (N), carry (C), and overflow (V) detection can be done on SIMD fields. For some instructions, the type of saturation may be encoded by field 384.

FIG. 4A is a block diagram illustrating an in-order pipeline and a register renaming stage, out-of-order issue/execution pipeline according to at least one embodiment of the invention. FIG. 4B is a block diagram illustrating an in-order architecture core and a register renaming logic, out-of-order issue/execution logic to be included in a processor according to at least one embodiment of the invention. The solid lined boxes in FIG. 4A illustrate the in-order pipeline, while the dashed lined boxes illustrates the register renaming, out-of-order issue/execution pipeline. Similarly, the solid lined boxes in FIG. 4B illustrate the in-order architecture logic, while the dashed lined boxes illustrates the register renaming logic and out-of-order issue/execution logic.

In FIG. 4A, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

In FIG. 4B, arrows denote a coupling between two or more units and the direction of the arrow indicates a direction of data flow between those units. FIG. 4B shows processor core 490 including a front end unit 430 coupled to an execution engine unit 450, and both are coupled to a memory unit 470.

The core 490 may be a reduced instruction set computing (RISC) core, a complex instruction set computing (CISC) core, a very long instruction word (VLIW) core, or a hybrid or alternative core type. As yet another option, the core 490 may be a special-purpose core, such as, for example, a network or communication core, compression engine, graphics core, or the like.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 434 is further coupled to a level 2 (L2) cache unit 476 in the memory unit 470. The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed). etc. The physical register file(s) unit(s) 458 is overlapped by the retirement unit 154 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.). Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 454 and the physical register file(s) unit(s) 458 are coupled to the execution cluster(s) 460. The execution cluster(s) 460 includes a set of one or more execution units 162 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The L2 cache unit 476 is coupled to one or more other levels of cache and eventually to a main memory.

By way of example, the exemplary register renaming, out-of-order issue/execution core architecture may implement the pipeline 400 as follows: 1) the instruction fetch 438 performs the fetch and length decoding stages 402 and 404; 2) the decode unit 440 performs the decode stage 406; 3) the rename/allocator unit 452 performs the allocation stage 408 and renaming stage 410; 4) the scheduler unit(s) 456 performs the schedule stage 412; 5) the physical register file(s) unit(s) 458 and the memory unit 470 perform the register read/memory read stage 414; the execution cluster 460 perform the execute stage 416; 6) the memory unit 470 and the physical register file(s) unit(s) 458 perform the write back/memory write stage 418; 7) various units may be involved in the exception handling stage 422; and 8) the retirement unit 454 and the physical register file(s) unit(s) 458 perform the commit stage 424.

The core 490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 5:
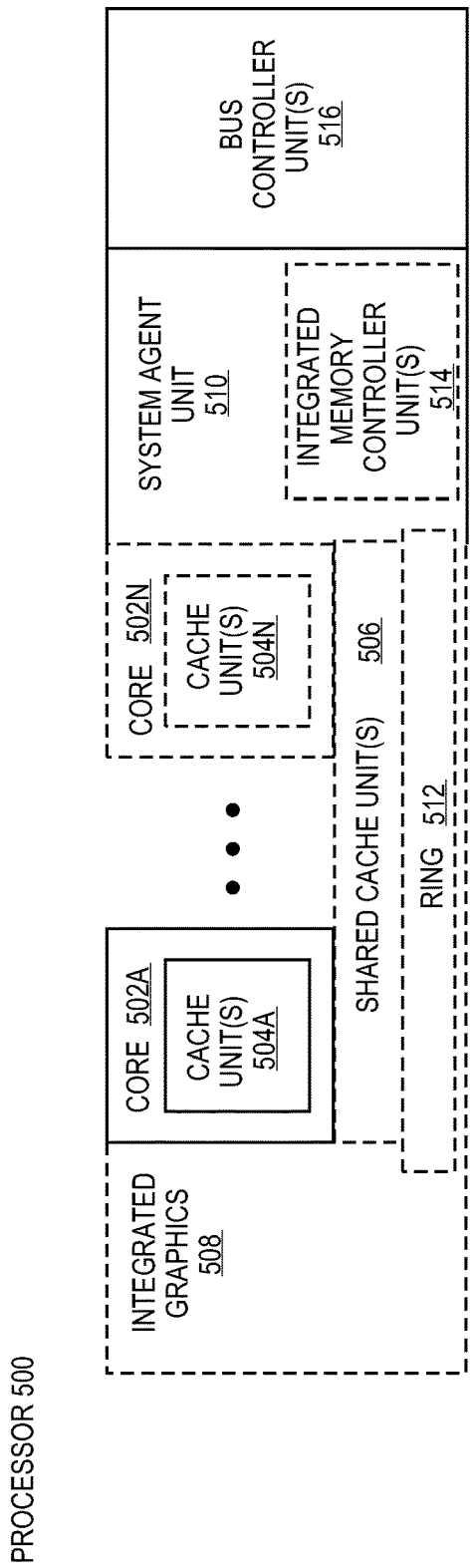
FIG. 5 is a block diagram of a processor according to one embodiment.

FIG. 5 is a block diagram of a single core processor and a multicore processor 500 with integrated memory controller and graphics according to embodiments of the invention. The solid lined boxes in FIG. 5 illustrate a processor 500 with a single core 502A, a system agent 510, a set of one or more bus controller units 516, while the optional addition of the dashed lined boxes illustrates an alternative processor 500 with multiple cores 502A-N, a set of one or more integrated memory controller unit(s) 514 in the system agent unit 510, and special purpose logic including integrated graphics logic 508. Each of processor cores 502A-502N includes one or more internal cache units 504A-504N. In some embodiments each processor core also has access to one or more shared cached units 506.

The internal cache units 504A-504N and shared cache units 506 represent a cache memory hierarchy within the processor 500. The cache memory hierarchy is a portion of an overall memory hierarchy for the processor that includes one or more internal cache units 504A-504N, the one or more shared cache units 506, and external memory (not shown) coupled to the set of integrated memory controller units 514. The set of shared cache units 506 may include one or more mid-level caches, such as level 2 (L2), level 3 (L3), level 4 (L4), or other levels of cache, a last level cache (LLC), and/or combinations thereof. While in one embodiment a ring based interconnect unit 512 interconnects the integrated graphics logic 508, the set of shared cache units 506, and the system agent unit 510, alternative embodiments may use any number of well-known techniques for interconnecting such units.

In some embodiments, one or more of the cores 502A-N are capable of multi-threading. The system agent 510 includes those components coordinating and operating cores 502A-N. The system agent unit 510 may include for example a power control unit (PCU) and a display unit. The PCU may be or include logic and components needed for regulating the power state of the cores 502A-N and the integrated graphics logic 508. The display unit is for driving one or more externally connected displays.

The cores 502A-N may be homogenous or heterogeneous in terms of architecture and/or instruction set. For example, some of the cores 502A-N may be in order while others are out-of-order. As another example, two or more of the cores 502A-N may be capable of execution the same instruction set, while others may be capable of executing only a subset of that instruction set or a different instruction set.

The processor may be a general-purpose processor, such as a Core™ i3, i5, i7, 2 Duo and Quad, Xeon™, Itanium™, XScale™ or StrongARM™ processor, which are available from Intel Corporation, of Santa Clara, Calif. Alternatively, the processor may be from another company, such as ARM Holdings, Ltd, MIPS, etc. The processor may be a special-purpose processor, such as, for example, a network or communication processor, compression engine, graphics processor, co-processor, embedded processor, or the like. The processor may be implemented on one or more chips. The processor 500 may be a part of and/or may be implemented on one or more substrates using any of a number of process technologies, such as, for example, BiCMOS, CMOS, or NMOS.

Figure 6:
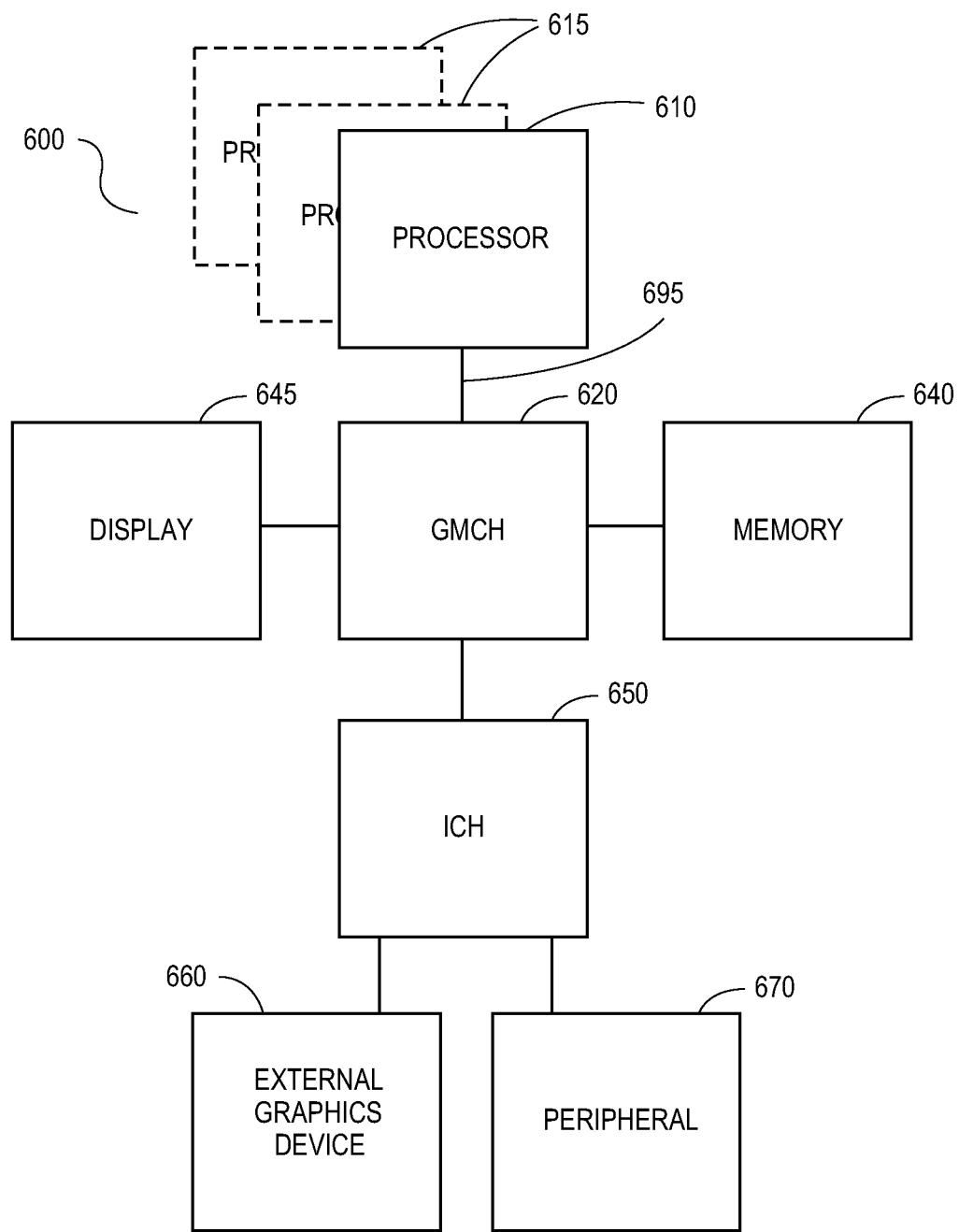
FIG. 6 is a block diagram of a computer system according to one embodiment.
Figure 7:
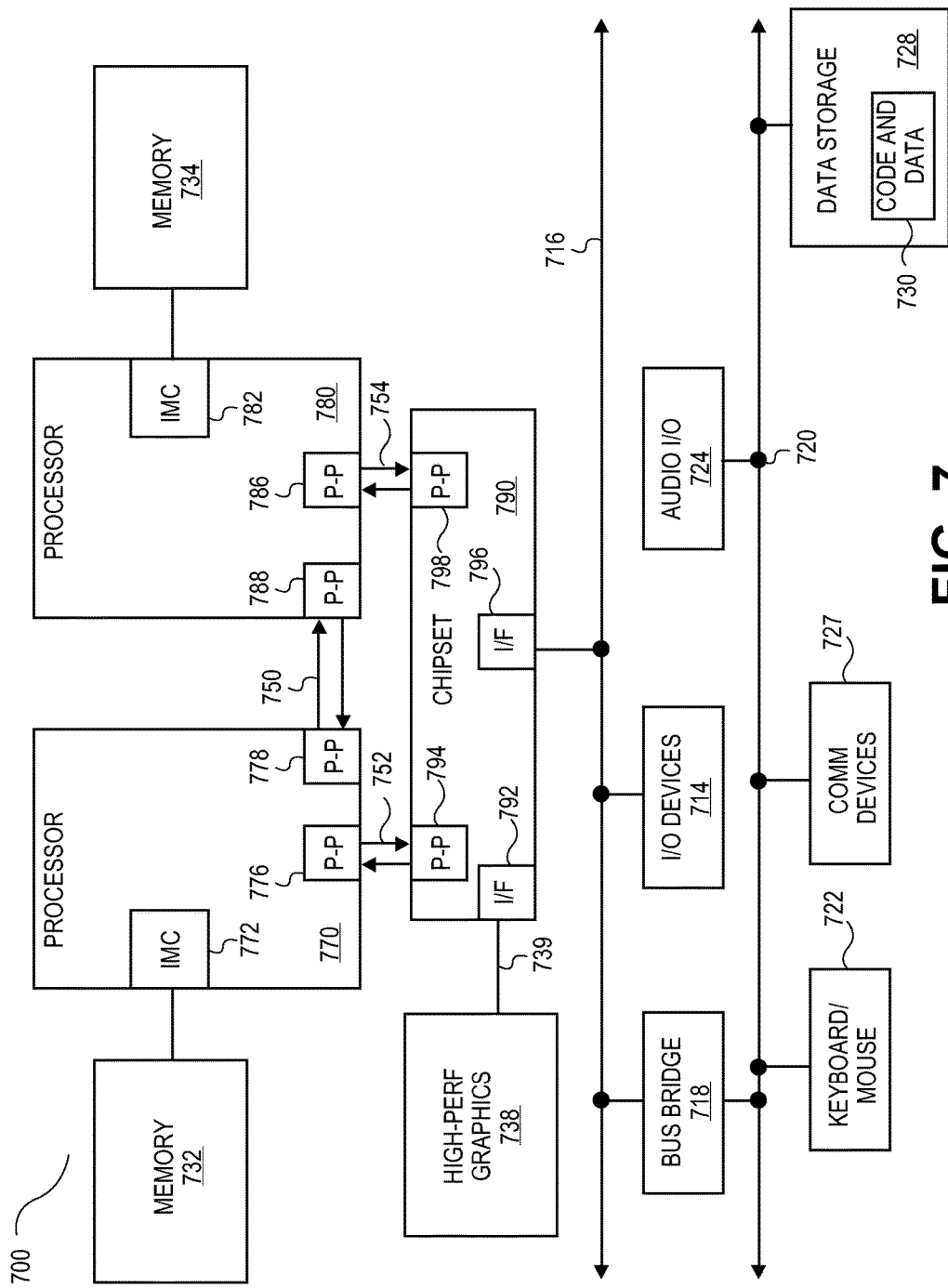
FIG. 7 is a block diagram of a computer system according to one embodiment.
Figure 8:
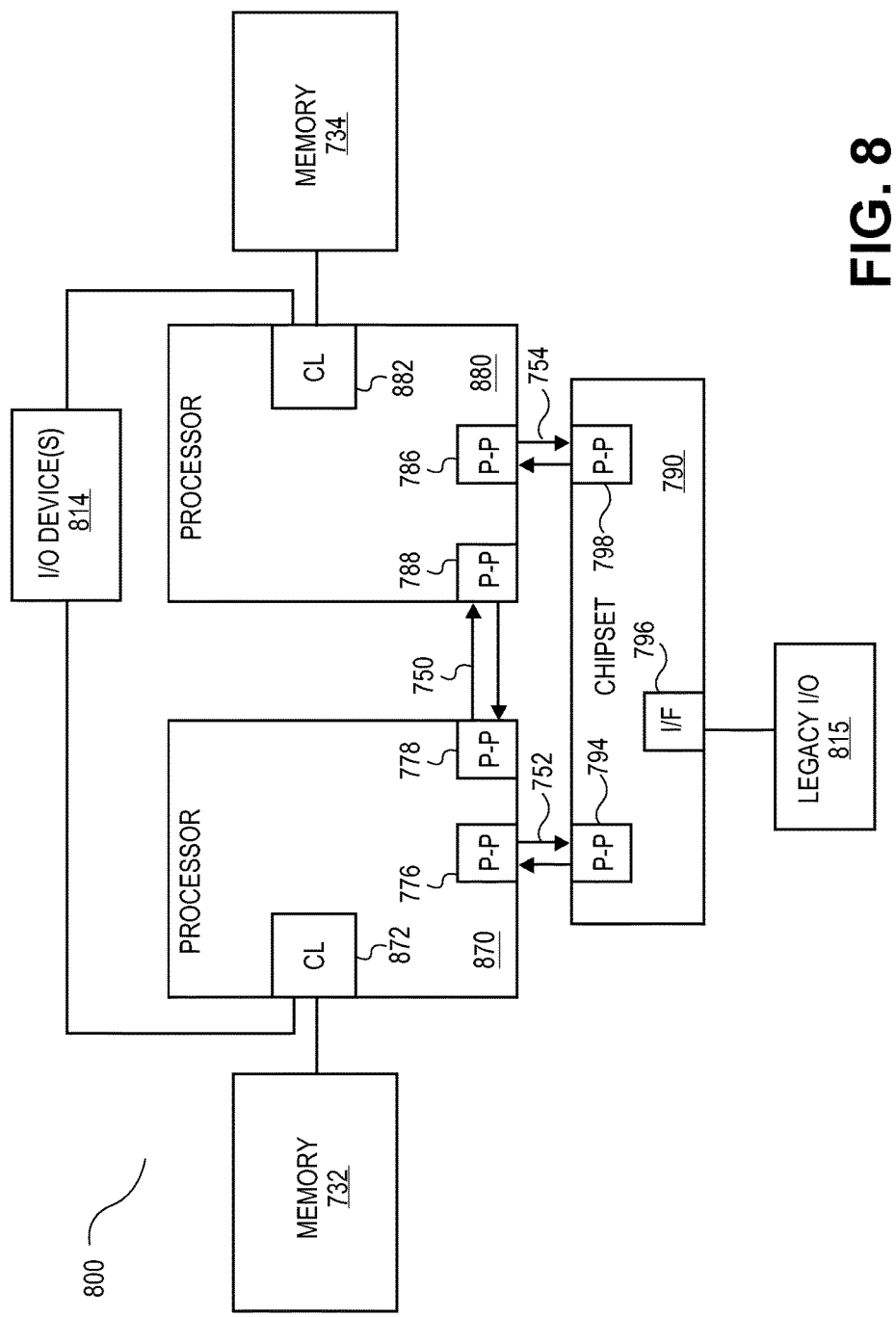
FIG. 8 is a block diagram of a computer system according to one embodiment.
Figure 9:
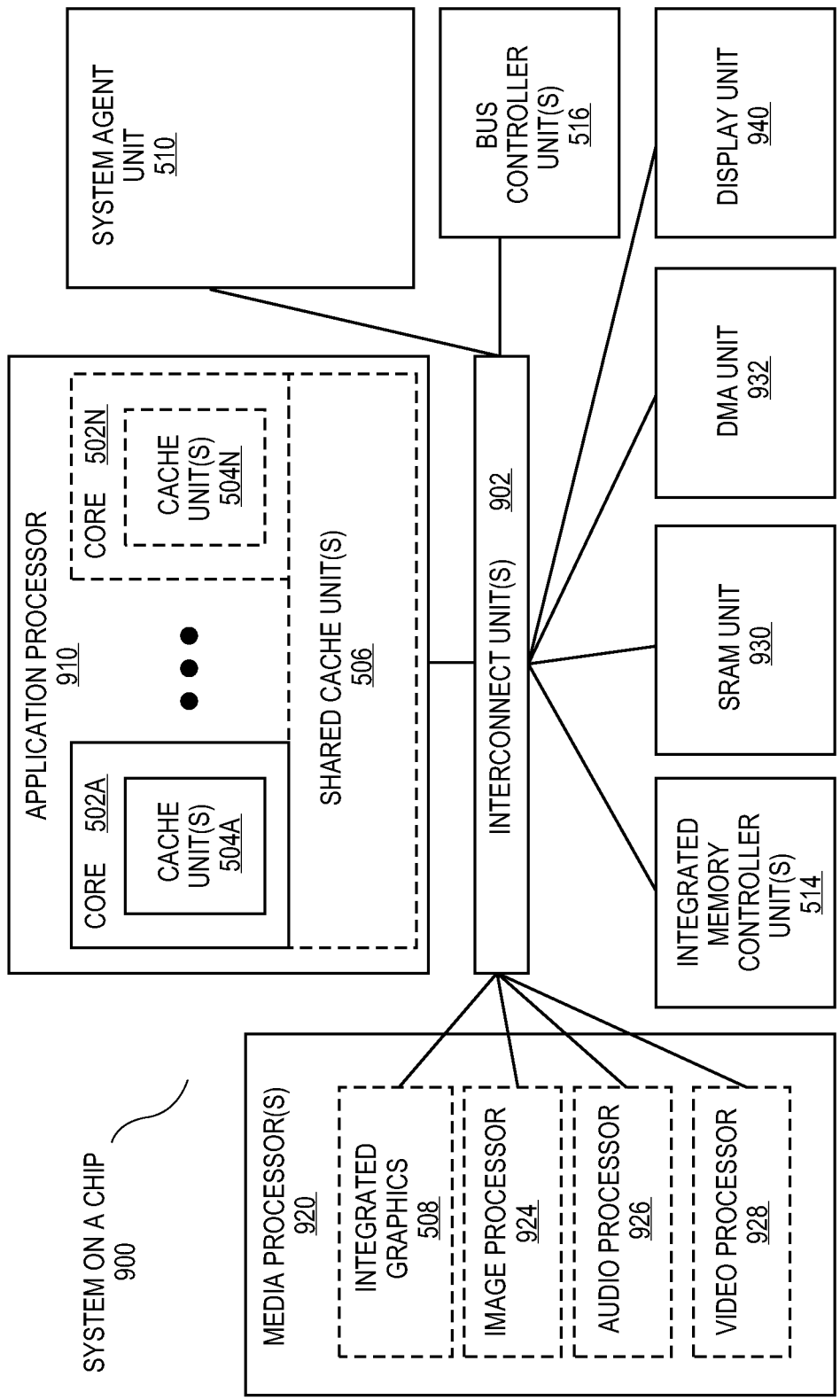
FIG. 9 is a block diagram of a system-on-a-chip according to one embodiment.

FIGS. 6-8 are exemplary systems suitable for including the processor 500, while FIG. 9 is an exemplary system on a chip (SoC) that may include one or more of the cores 502. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 6, shown is a block diagram of a system 600 in accordance with one embodiment. The system 600 may include one or more processors 610, 615, which are coupled to graphics memory controller hub (GMCH) 620. The optional nature of additional processors 615 is denoted in FIG. 6 with broken lines.

Each processor 610,615 may be some version of the processor 500. However, it should be noted that it is unlikely that integrated graphics logic and integrated memory control units would exist in the processors 610,615. FIG. 6 illustrates that the GMCH 620 may be coupled to a memory 640 that may be, for example, a dynamic random access memory (DRAM). The DRAM may, for at least one embodiment, be associated with a non-volatile cache.

The GMCH 620 may be a chipset, or a portion of a chipset. The GMCH 620 may communicate with the processor(s) 610, 615 and control interaction between the processor(s) 610, 615 and memory 640. The GMCH 620 may also act as an accelerated bus interface between the processor(s) 610, 615 and other elements of the system 600. For at least one embodiment, the GMCH 620 communicates with the processor(s) 610, 615 via a multi-drop bus, such as a frontside bus (FSB) 695.

Furthermore, GMCH 620 is coupled to a display 645 (such as a flat panel display). GMCH 620 may include an integrated graphics accelerator. GMCH 620 is further coupled to an input/output (I/O) controller hub (ICH) 650, which may be used to couple various peripheral devices to system 600. Shown for example in the embodiment of FIG. 6 is an external graphics device 660, which may be a discrete graphics device coupled to ICH 650, along with another peripheral device 670.

Alternatively, additional or different processors may also be present in the system 600. For example, additional processor(s) 615 may include additional processors(s) that are the same as processor 610, additional processor(s) that are heterogeneous or asymmetric to processor 610, accelerators (such as, e.g., graphics accelerators or digital signal processing (DSP) units), field programmable gate arrays, or any other processor. There can be a variety of differences between the physical resources 610, 615 in terms of a spectrum of metrics of merit including architectural, microarchitectural, thermal, power consumption characteristics, and the like. These differences may effectively manifest themselves as asymmetry and heterogeneity amongst the processors 610, 615. For at least one embodiment, the various processors 610, 615 may reside in the same die package.

Referring now to FIG. 7, shown is a block diagram of a second system 700 in accordance with an embodiment. As shown in FIG. 7, multiprocessor system 700 is a point-to-point interconnect system, and includes a first processor 770 and a second processor 780 coupled via a point-to-point interconnect 750. Each of processors 770 and 780 may be some version of the processor 500 as one or more of the processors 610,615.

While shown with only two processors 770, 780, it is to be understood that the scope of the embodiments is not so limited. In other embodiments, one or more additional processors may be present in a given processor.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 across a high-performance graphics interface 739 that is coupled with the chipset 790 via an interface 792.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the embodiments is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Referring now to FIG. 8, shown is a block diagram of a third system 800 in accordance with an embodiment. Like elements in FIGS. 7 and 8 bear like reference numerals, and certain aspects of FIG. 7 have been omitted from FIG. 8 in order to avoid obscuring other aspects of FIG. 8.

FIG. 8 illustrates that the processors 870, 880 may include integrated memory and I/O control logic ("CL") 872 and 882, respectively. For at least one embodiment, the CL 872, 882 may include integrated memory controller units such as the integrated memory controller unit(s) 514 of FIG. 5 and the IMCs 772 and 782 of FIG. 7. In addition. CL 872, 882 may also include I/O control logic. FIG. 8 illustrates that not only are the memories 732, 734 coupled to the CL 872, 882, but also that one or more I/O device(s) 814 are also coupled to the control logic 872, 882. Legacy I/O devices 815 may be coupled to the chipset 790, for example, if those devices are not or cannot be coupled via the CL 872, 882.

Referring now to FIG. 9, shown is a block diagram of a SoC 900 in accordance with an embodiment. Similar elements in FIG. 5 bear like reference numerals. Also, dashed lined boxes are optional features on more advanced SoCs. In FIG. 9, an interconnect unit(s) 902 is coupled to: an application processor 910 which includes a set of one or more cores 502A-N including internal cache unit(s) 504A-N and shared cache unit(s) 506; a system agent unit 510; a bus controller unit(s) 516; an integrated memory controller unit(s) 514; a set or one or more media processors 920 which may include integrated graphics logic 508, an image processor 924 for providing still and/or video camera functionality, an audio processor 926 for providing hardware audio acceleration, and a video processor 928 for providing video encode/decode acceleration; an static random access memory (SRAM) unit 930; a direct memory access (DMA) unit 932; and a display unit 940 for coupling to one or more external displays.

Figure 10:
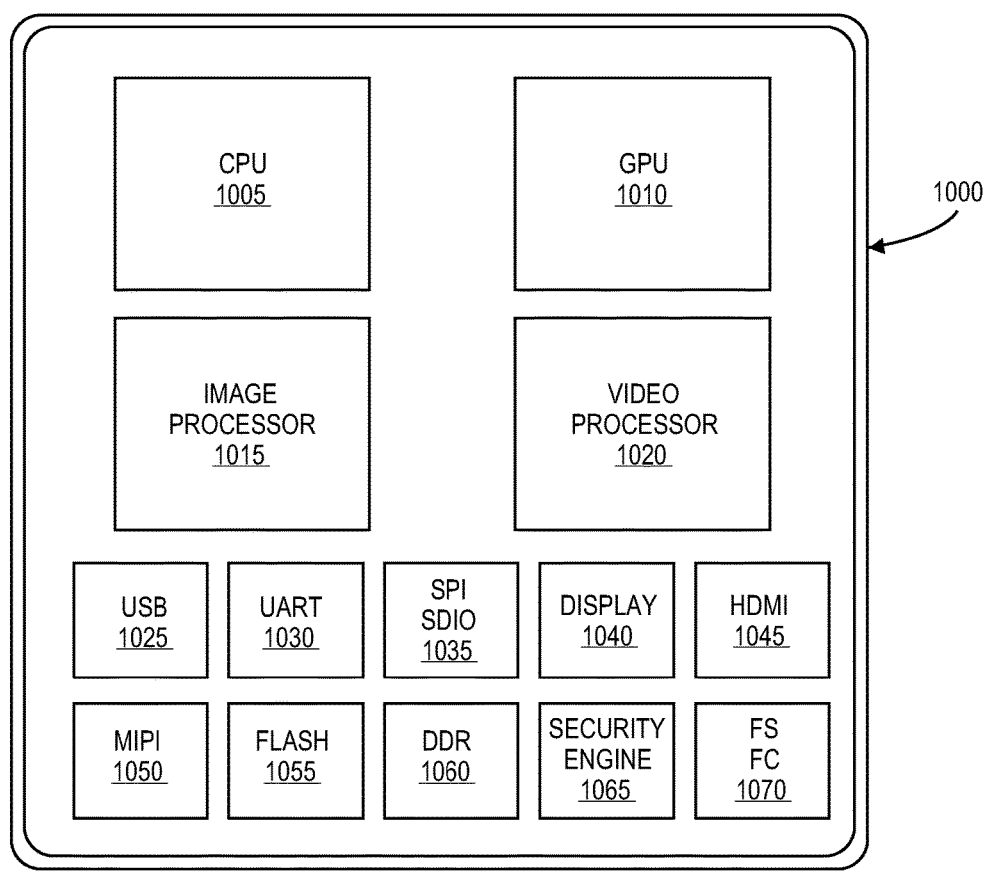
FIG. 10 is a block diagram of a processor according to one embodiment.

FIG. 10 illustrates a processor containing a central processing unit (CPU) and a graphics processing unit (GPU), which may perform at least one instruction according to one embodiment. In one embodiment, an instruction to perform operations according to at least one embodiment could be performed by the CPU. In another embodiment, the instruction could be performed by the GPU. In still another embodiment, the instruction may be performed through a combination of operations performed by the GPU and the CPU. For example, in one embodiment, an instruction in accordance with one embodiment may be received and decoded for execution on the GPU. However, one or more operations within the decoded instruction may be performed by a CPU and the result returned to the GPU for final retirement of the instruction. Conversely, in some embodiments, the CPU may act as the primary processor and the GPU as the co-processor.

In some embodiments, instructions that benefit from highly parallel, throughput processors may be performed by the GPU, while instructions that benefit from the performance of processors that benefit from deeply pipelined architectures may be performed by the CPU. For example, graphics, scientific applications, financial applications and other parallel workloads may benefit from the performance of the GPU and be executed accordingly, whereas more sequential applications, such as operating system kernel or application code may be better suited for the CPU.

In FIG. 10, processor 1000 includes a CPU 1005, GPU 1010, image processor 1015, video processor 1020, USB controller 1025, UART controller 1030, SPI/SDIO controller 1035, display device 1040, HDMI interface1045, MIPI controller 1050, flash memory controller 1055, dual data rate (DDR) controller 1060, security engine 1065, and I$^2$S/I$^2$C controller 1070. Other logic and circuits may be included in the processor of FIG. 10, including more CPUs or GPUs and other peripheral interface controllers.

One or more aspects of at least one embodiment may be implemented by representative data stored on a machine-readable medium which represents various logic within the processor, which when read by a machine causes the machine to fabricate logic to perform the techniques described herein. Such representations, known as "IP cores" may be stored on a tangible, machine readable medium ("tape") and supplied to various customers or manufacturing facilities to load into the fabrication machines 1165 that actually make the logic or processor. For example, IP cores, such as the Cortex™ family of processors developed by ARM Holdings, Ltd. and Loongson IP cores developed the Institute of Computing Technology (ICT) of the Chinese Academy of Sciences may be licensed or sold to various customers or licensees, such as Texas Instruments, Qualcomm, Apple, or Samsung and implemented in processors produced by these customers or licensees.

Figure 11:
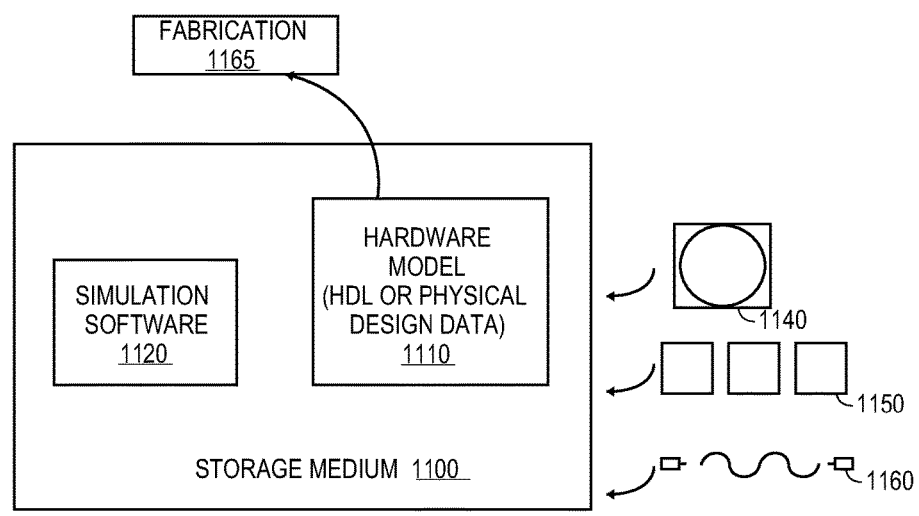
FIG. 11 is a block diagram of an IP core development system according to one embodiment.

FIG. 11 shows a block diagram illustrating the development of IP cores according to one embodiment. A Storage medium 1100 includes simulation software 1120 and/or hardware or software model 1110. In one embodiment, the data representing the IP core design can be provided to the storage medium 1100 via memory 1140 (e.g., hard disk), wired connection (e.g., internet) 1150 or wireless connection 1160. The IP core information generated by the simulation tool and model can then be transmitted to a fabrication facility where it can be fabricated by a 3$^{rd}$ party to perform at least one instruction in accordance with at least one embodiment.

In some embodiments, one or more instructions may correspond to a first type or architecture (e.g., x86) and be translated or emulated on a processor of a different type or architecture (e.g., ARM). An instruction, according to one embodiment, may therefore be performed on any processor or processor type, including ARM, x86, MIPS, a GPU, or other processor type or architecture.

Figure 12:
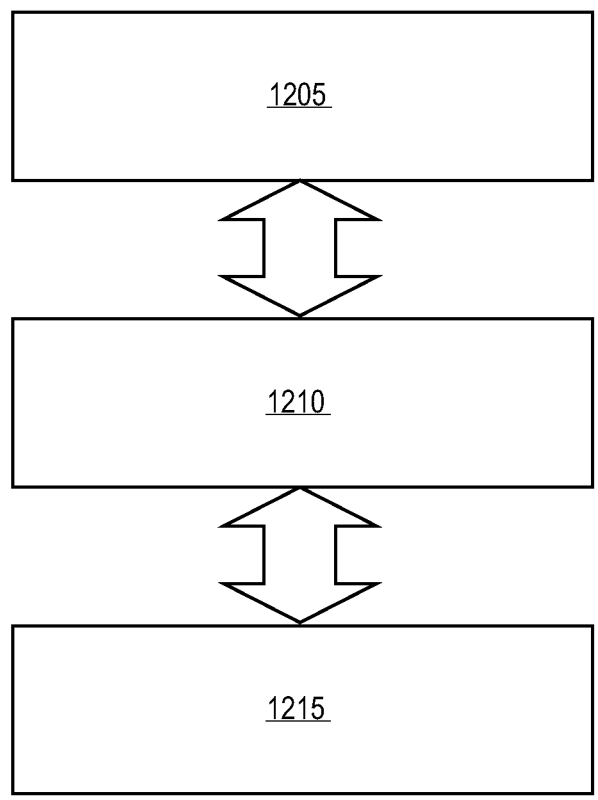
FIG. 12 illustrates an architecture emulation system according to one embodiment.

FIG. 12 illustrates how an instruction of a first type is emulated by a processor of a different type, according to one embodiment. In FIG. 12, program 1205 contains some instructions that may perform the same or substantially the same function as an instruction according to one embodiment. However the instructions of program 1205 may be of a type and/or format that is different or incompatible with processor 1215, meaning the instructions of the type in program 1205 may not be able to executed natively by the processor 1215. However, with the help of emulation logic, 1210, the instructions of program 1205 are translated into instructions that are natively capable of being executed by the processor 1215. In one embodiment, the emulation logic is embodied in hardware. In another embodiment, the emulation logic is embodied in a tangible, machine-readable medium containing software to translate instructions of the type in the program 1205 into the type natively executable by the processor 1215. In other embodiments, emulation logic is a combination of fixed-function or programmable hardware and a program stored on a tangible, machine-readable medium. In one embodiment, the processor contains the emulation logic, whereas in other embodiments, the emulation logic exists outside of the processor and is provided by a third party. In one embodiment, the processor is capable of loading the emulation logic embodied in a tangible, machine-readable medium containing software by executing microcode or firmware contained in or associated with the processor.

Figure 13:
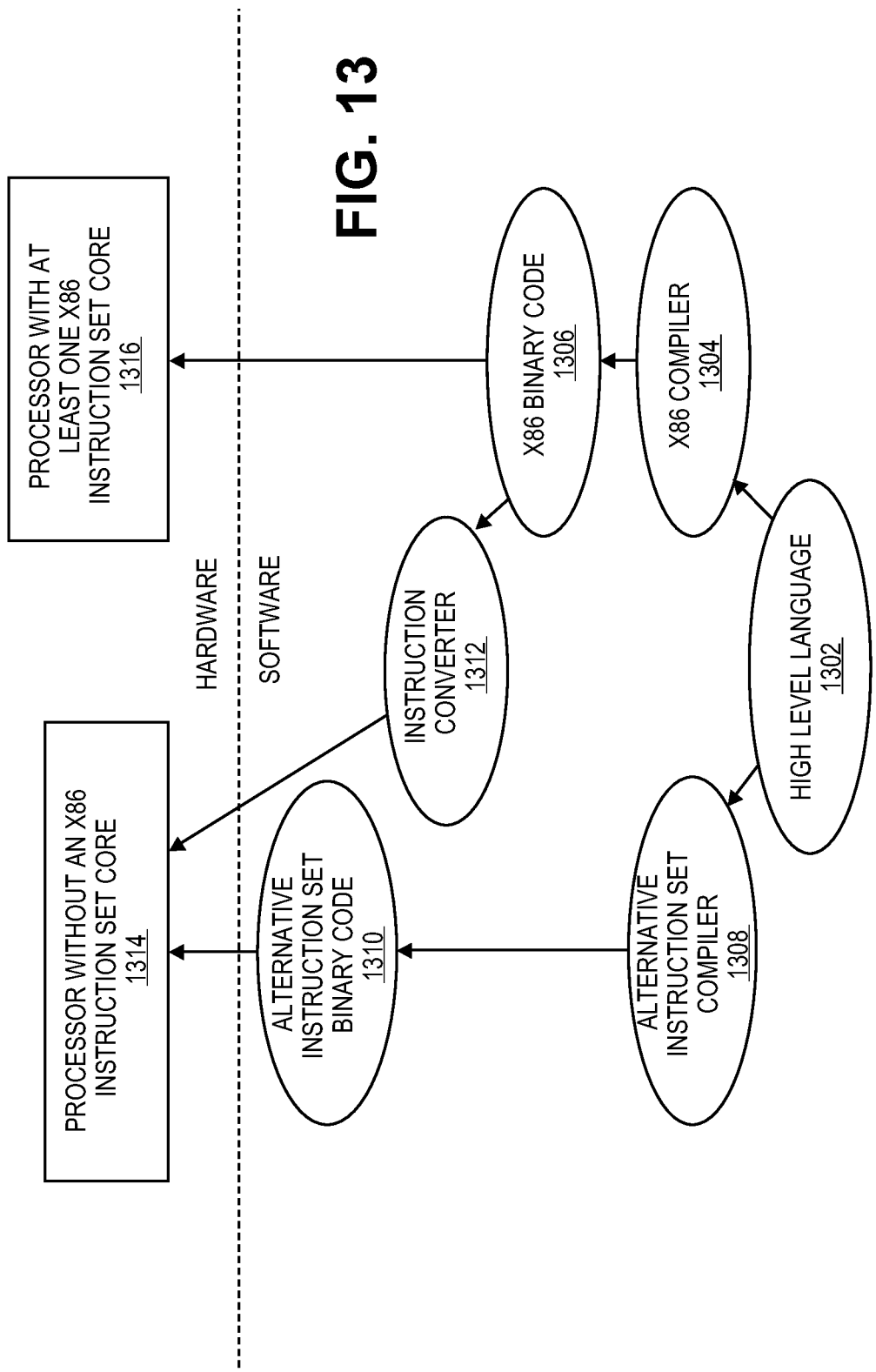
FIG. 13 illustrates a system to translate instructions according to one embodiment.

FIG. 13 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 13 shows a program in a high level language 1302 may be compiled using an x86 compiler 1304 to generate x86 binary code 1306 that may be natively executed by a processor with at least one x86 instruction set core 1316. The processor with at least one x86 instruction set core 1316 represents any processor that can perform substantially the same functions as a Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1304 represents a compiler that is operable to generate x86 binary code 1306 (e.g., object code) that can, with or without additional linkage processing, be executed on the processor with at least one x86 instruction set core 1316. Similarly, FIG. 13 shows the program in the high level language 1302 may be compiled using an alternative instruction set compiler 1308 to generate alternative instruction set binary code 1310 that may be natively executed by a processor without at least one x86 instruction set core 1314 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1312 is used to convert the x86 binary code 1306 into code that may be natively executed by the processor without an x86 instruction set core 1314. This converted code is not likely to be the same as the alternative instruction set binary code 1310 because an instruction converter capable of this is difficult to make; however, the converted code will accomplish the general operation and be made up of instructions from the alternative instruction set. Thus, the instruction converter 1312 represents software, firmware, hardware, or a combination thereof that, through emulation, simulation or any other process, allows a processor or other electronic device that does not have an x86 instruction set processor or core to execute the x86 binary code 1306.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Embodiments of are implemented as any one or a combination of: one or more microchips or integrated circuits interconnected using a parent-board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments involve an instruction and associated logic for software hints to improve hardware prefetcher effectiveness. Described herein is a low overhead approach to enable software to convey hints to hardware so that the hardware prefetcher can adjust prefetch aggressiveness accordingly, resulting in an improvement to overall performance. In one embodiment provides prefetcher logic and associated ISA instructions to enables software assisted adaptive hardware prefetcher. The software assisted adaptive hardware prefetcher attempts to observe and predict, at run time, the behavior associated with an executing program and attempts to dynamically select a prefetching policy. To remedy issues that may arise when performing hardware-only prefetch prediction, an interface is enabled in which software that has knowledge of the access patterns of executing software applications can convey hints on the behavior of the program to the hardware prefetcher in a low-overhead fashion. The hardware can then use the hint to configure and tune the type and aggressiveness of the prefetcher at run time to achieve optimal performance. Enabling software assistance to the adaptive hardware prefetcher enables the hardware prefetcher to be optimized to avoid latency issues associated with heuristic convergence and can improve system performance when executing software that undergoes frequent memory access phase changes.

Many hardware prefetcher designs strive to detect the access pattern and prefetch accordingly. Hardware prefetcher examples include a spatial hardware prefetcher, which prefetches adjacent cache-lines as a cache block pair or a streamer prefetcher that prefetches successive blocks into a cache when a stride in the access pattern is detected. While these exemplary hardware prefetcher examples include adaptive logic to determine when various prefetching algorithms should be enabled, the adaptation logic is heuristic and may have convergence latency before a change in a memory access pattern is detected. Thus, for some workloads, access phases may change too rapidly for the hardware-based detection logic to be effective.

While software methods currently exist to influence prefetching behavior within hardware, the existing methods do not provide the benefits of the techniques enabled by embodiments described herein. For example, one exemplary software based approach is to use software-based prefetching instructions provided by a processor ISA. Prefetching instructions can provide complete control over when and how prefetches should be performed. However, such instructions must occupy processor pipeline resources in the same manner as any other processor instruction. Thus, when a processor is executing a software prefetch instruction, the execution resources are consumed that would otherwise be spent executing other instructions. Accordingly, explicit prefetching instructions should be used sparingly. Additionally, many commonly executed workloads exhibit memory usage patterns that can be readily recognized by hardware-based prefetchers. The prefetch logic can discover the relatively simple patterns within the memory usage of these workloads and predict and prefetch future addresses without requiring explicit software prefetching instructions. However, not all workloads exhibit these relatively simple patterns. In the event the memory access patterns of a workload are random or unpredictable the hardware prefetchers can actually reduce, rather than enhance performance.

In some instances, direct control of hardware prefetchers can be exerted by software via the use of control registers that directly control the hardware prefetchers. These registers can be used to change a small set of prefetch parameters and to turn them on or off. However, writing to the control registers is slow and responding to prefetching behavior that changes depending on the phase of a workload is impractical. Additionally, these registers only provide very high-level controls to the prefetchers, such as turning the prefetchers on or off, or in some circumstances, changing the aggressiveness or one or more prefetchers. While it may be possible to disable or enable one or more hardware prefetchers during certain execution phases of software, or isolate different software stages on different cores having different prefetching configurations, such methods require complicated programming and configuration and do now allow thread migration between cores.

The drawbacks of existing techniques can be remedied by embodiments described herein, which provide instructions and logic to enable software to provide hints to improve hardware prefetcher effectiveness. In contrast to the techniques described above, the techniques described herein enable a low-overhead method to tune and configure hardware prefetcher at run time for optimal performance.

Figure 14:
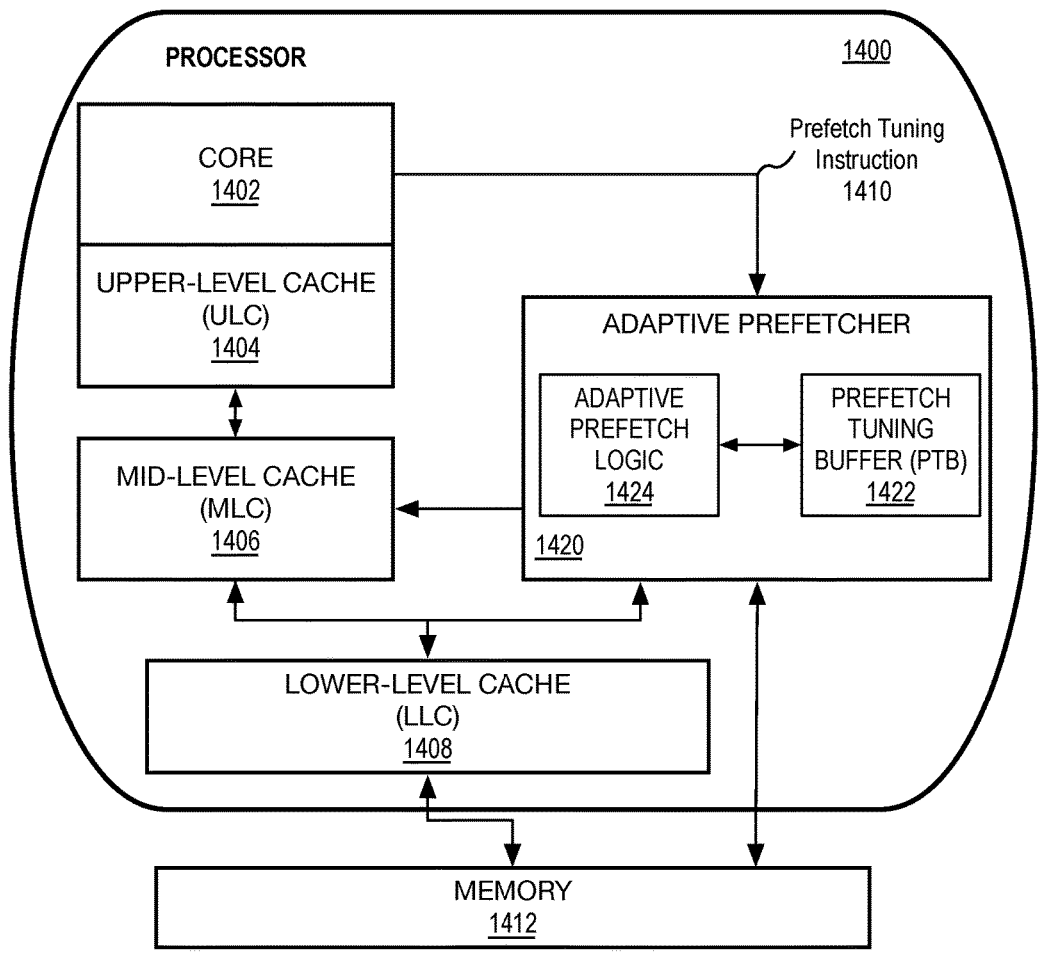
FIG. 14 is an illustration of a processor having support for software hints to improve hardware prefetcher effectiveness, according to an embodiment.

FIG. 14 is an illustration of a processor 1400 having support for software hints to improve hardware prefetcher effectiveness, according to an embodiment. The processor 1400 includes at least one processor core 1402, with various embodiments including various numbers of processor cores. Each processor core 1402 includes a level one (L1) cache 1404, which may also be referred to as an upper-level cache (ULC). The L1 cache 1404 can be divided into separate instruction caches and data caches, or can be a unified cache including instructions and data. The processor 1400 also includes a level two (L2) cache 1406, which may also be referred to as a mid-level cache (MLC). In one embodiment the L2 cache 1406 is a unified cache that includes instructions and data. The L2 cache 1406 can be specific to the processor core 1402 or can be shared with other cores within the processor 1400. The processor also includes a level three (L3) cache 1408, which may also be referred to as a last-level cache (LLC). The L3 cache 1408 can be used to cache data that is retrieved from memory 1412. In one embodiment the memory 1412 is system memory configured to store instructions and data for executing threads on the processor core 1402. In such embodiment the system memory, where system memory can include SDRAM based memory or a two-level system memory including volatile and non-volatile memory configured as a unified system memory.

The L1 1404, L2 1406, and L3 1408 cache data and/or instructions based on a specified cache management policy. The cache management policy may be an inclusive policy in which any cache line stored in a cache relatively higher in the hierarchy (e.g., the L1 cache 1404) is also present in a cache further down the hierarchy (e.g., in the L2 cache 1406 or L3 cache 1408). An exclusive cache management policy may also be implemented in which a cache line is stored in only one cache in the hierarchy at a time, excluding other caches from storing the cache line. Alternatively, a non-inclusive non-exclusive cache inclusion policy may be in place in which data stored in an upper level cache may or may not be present in one or more of the lower level caches.

The processor 1400 also includes a prefetcher, such as an adaptive prefetcher 1420 that can apply one or more prefetching algorithms based on memory access patterns of threads executing on the processor core 1402. The adaptive prefetcher 1420 is a hardware-based prefetcher including adaptive prefetch logic 1424 that can dynamically train one or more prefetcher algorithms to prefetch data into the L2 cache 1406 or L3 cache 1408 based on observed access patterns for a thread executing on the processor core 1402. While the adaptive prefetcher 1420 is illustrated as a separate module configured to perform prefetch activities for the L2 cache 1406 and L3 cache 1408, in one embodiment one or more instances of the adaptive prefetcher 1420 is dedicated to, included within, and/or tightly coupled with the L2 cache 1406 and/or L3 cache 1408. In one embodiment, one or more prefetchers are also present to prefetch instructions and/or data into the L1 cache 1404.

While the L3 cache 1408 is illustrated as the last level of the cache hierarchy of the processor 1400, some embodiments include other levels of cache memory within the processor 1400, such as a level four (L4) cache within a portion of an embedded DRAM. For example, the memory 1412 may be an embedded DRAM that includes or is configured as an L4 cache.

In one embodiment the adaptive prefetcher 1420 dynamically implements one or more prefetcher algorithms that attempt to predict the instructions and/or data that a thread executing on the processor core 1402 will require in the future and responsively pre-fetches those instructions and/or data into the requisite caches. The adaptive prefetch logic 1424 within the adaptive prefetcher 1420 can include multiple detectors for learning and identifying prefetch candidates and can store state information for learning and identifying prefetch candidates. Based on detected access patterns, multiple prefetcher algorithms can be evaluated in parallel and one or more of the algorithms can be applied to predict and prefetch instructions and/or data into the L2 cache 1406 and/or L3 cache 1408. The adaptive prefetch logic 1424 can apply a specific prefetcher algorithm at various levels of aggressiveness if the algorithm is determined to be effective for an observed memory access pattern. The adaptive prefetch logic 1424 can also include a throttling mechanism that can reduce the rate at which a given algorithm is applied based on the accuracy of the given algorithm.

Exemplary prefetcher algorithms that can be evaluated by the adaptive prefetch logic 1424 included a spatial hardware prefetcher algorithm and a streamer prefetcher algorithm, although other prefetcher algorithms may also be supported. The spatial hardware prefetcher algorithm prefetches adjacent cache-lines as a cache block pair. For example, for a cache having 64-byte cache lines, a request for one cache line can fetch two 64-byte cache lines as a single 128-byte sector, without regard to whether the additional cache line has been requested. However, the spatial prefetcher algorithm can cause a higher cache-miss ratio when executing workloads with poor spatial locality. The streamer prefetcher algorithm can adaptively fetch streams of instructions or data based on a detected stride in the memory access patterns of a thread. An access pattern stride indicates that memory access is occurring at a specified interval, such that a stride of one indicates sequential memory access, a stride of two indicates every other memory element is accessed, and a stride of k indicates that every k memory element is accessed. If the streamer prefetcher algorithm detects successive cache misses at a specific stride, additional memory locations can be pre-fetched based on the detected stride.

In addition to the exemplary spatial and streamer prefetcher algorithms, additional prefetcher algorithms may also be used. Additionally, certain prefetcher algorithms can be used to prefetch data into specific levels of cache. The process in which the adaptive prefetch logic 1424 determines memory access patterns is referred to as 'training.' However, the training process is heuristic and based on observed memory access patterns. Thus, prefetcher training exhibits at least some degree of convergence latency before a change in a memory access pattern can be detected. Thus, for some workloads, access phases may change too rapidly for the hardware-based detection logic to be effective.

To reduce the latency associated with existing hardware prefetcher algorithms the processor 1400 can include support for a prefetch tuning instruction 1410 and a prefetch tuning buffer (PTB) 1422 that enables software hints to tune the training process as applied to a given set of memory pages. In one embodiment the prefetch tuning instruction 1410 specifies a set of one or more memory pages for which the prefetch training process is to be tuned. In one embodiment the prefetch tuning instruction 1410 can additionally specify one or more specific prefetcher algorithms in conjunction with the set of memory pages and training will be adapted only for the specified prefetcher algorithms. In one embodiment the prefetch tuning instruction 1410 can also specify a tuning action that is be applied for the one or more prefetcher algorithms with respect to the set of memory pages.

State information for the set of memory pages specified by the prefetch tuning instruction 1410 can be stored in the PTB 1422. The adaptive prefetch logic 1424 can then read the PTB 1422 during prefetcher algorithm training and tune the training process based on the stored state provide by the prefetch tuning instruction 1410.

In one embodiment the prefetch tuning instruction 1410 can configure the adaptive prefetcher to exclude a specified set of memory pages from training activity associated with a prefetcher algorithm, such that the prefetcher algorithm will not use memory pages within the specified set of memory pages to determine a potential memory access pattern. In some configurations this may implicitly have the effect of disabling prefetching from the specified set of memory pages for at least some of the prefetcher algorithms supported by the adaptive prefetch logic 1424. In one embodiment the prefetch tuning instruction 1410 can be used to explicitly enable prefetching for the set of memory pages, for example if a specific prefetcher algorithm is disabled or inactive. For example, one or more prefetcher algorithms can be generally disabled for a thread, workload, processor, or processor core, and prefetching can be selectively enabled for specific memory pages. In one embodiment the prefetch tuning instruction 1410 can be used to tune the aggressiveness in which one or more prefetcher algorithms will prefetch from the specified set of memory pages, where the prefetch aggressiveness can determine one or more of the prefetch distance and/or prefetch degree of the prefetcher. Prefetch Distance determines how far ahead of the access stream the prefetcher tries to prefetch, where a conservative prefetch distance is small and close to the demand stream, while an aggressive prefetch distance is larger away from the demand stream in attempt to better hide memory access latency. Prefetch distance specifies the number of prefetches that are issued in response to a demand access, with more aggressive configurations prefetching larger amounts of data. More aggressive prefetching better hides memory access latency but is more speculative and may have a lower accuracy rate.

The specific implementation of the prefetch tuning instruction 1410 can vary amongst embodiments. In one embodiment the prefetch tuning instruction is an additional instruction added to the ISA of the processor core 1402 and is defined by a unique operation code. In such embodiment, the processor core 1402 can fetch and decode the prefetch tuning instruction 1410 and can configure the adaptive prefetcher 1420 based on one or more operands of the prefetch tuning instruction 1410. Configuring the adaptive prefetcher 1420 can include forwarding the prefetch tuning instruction 1410 to the adaptive prefetcher or issuing one or more commands to the adaptive prefetcher 1420 to configure the PTB 1422 with a set of memory pages and associated prefetch tuning state. In one embodiment the prefetch tuning instruction 1410 is an adaptation to an existing ISA instruction. For example, one or more operands a existing software prefetch instruction is adapted to include additional bits that indicate that, instead of prefetching a specified memory page, the PTB 1422 is to be updated with the specified memory page and associated prefetch tuning state.

In one embodiment, software can be implemented while localizing hardware logic changes to the adaptive prefetcher 1420, without requiring any adjustments to the processor core 1402 or the ISA associated with the processor core. In such embodiment, the adaptive prefetcher 1420 includes logic to recognize a prefetch command received from the processor core 1402 to a specific address or address range as a command to store or modify data in the PTB 1422 for a specific hardware page or set of hardware pages. The hardware page and prefetch tuning options can be encoded within the address of the prefetch command. Instead of performing a prefetch from the specified address, the adaptive prefetcher 1420 can store an entry in the PTB 1422 for an encoded physical page number encoded within the address. Additional information can also be encoded within the address. For example, one or more prefetcher algorithms can be specified and/or a type of tuning to be applied (e.g., exclusion, inclusion, aggressiveness, etc.) for the specified physical page number.

Figure 15A:
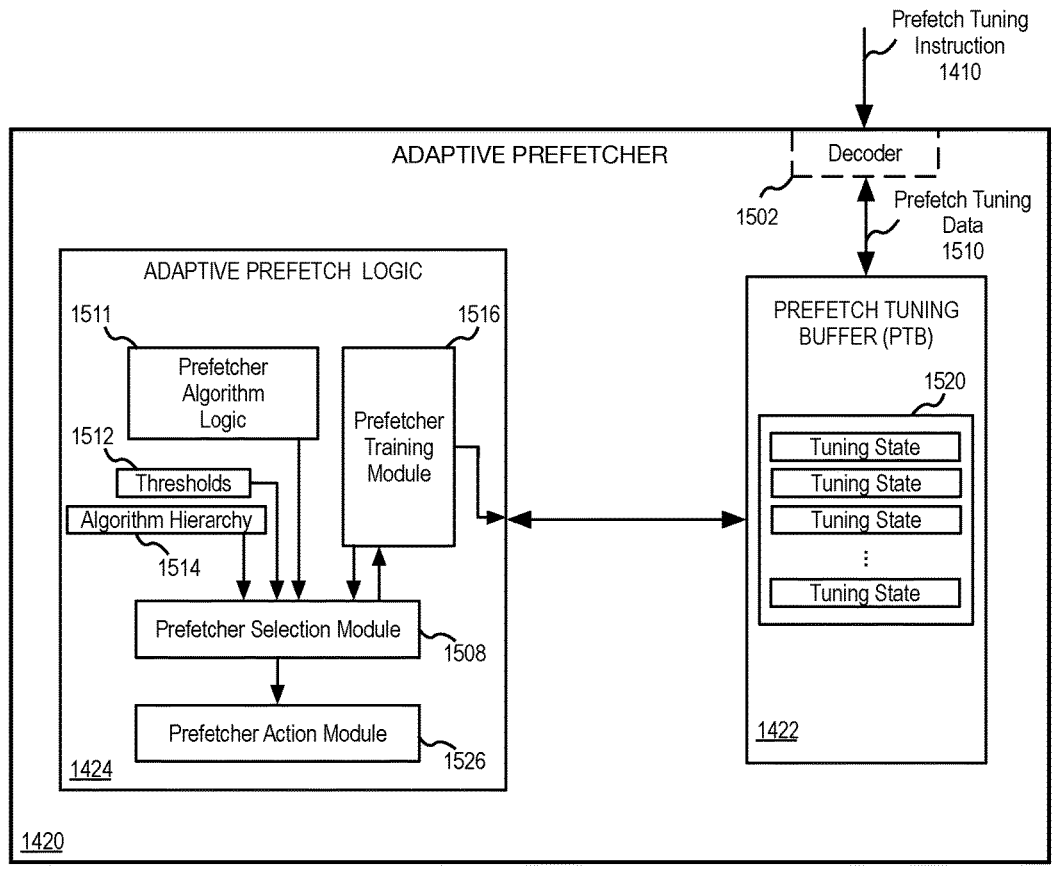
FIGS. 15A-15B illustrate logic and instructions for software hints to improve hardware prefetcher effectiveness, according to an embodiment.
Figure 15B:
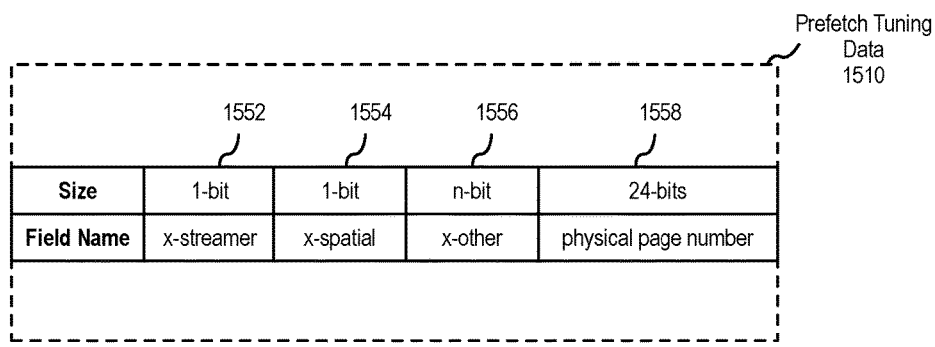

FIGS. 15A-15B illustrate logic and instructions for software hints to improve hardware prefetcher effectiveness, according to an embodiment. FIG. 15A is a more detailed illustration of the adaptive prefetcher 1420 of FIG. 14 above, according to one embodiment. In one embodiment the adaptive prefetcher 1420 receive a prefetch tuning instruction 1410 including prefetch tuning data 1510, which can be an instruction relayed from a processor core (e.g., processor core 1402 of FIG. 14). In one embodiment the prefetch tuning instruction 1410 represents a command relayed from the processor core after fetching, decoding, and executing a prefetch tuning instruction or prefetch instruction. The adaptive prefetcher 1420 can optionally include a decoder 1502 that can decode or interpret the prefetch tuning instruction 1410 or an associated prefetch command sent by the processor core in response to a decoded prefetch instruction. The decoded or interpreted instruction or command includes prefetch tuning data 1510 that can be stored in the prefetch tuning buffer (PTB) 1422.

Based on the prefetch tuning data 1510, the PTB 1422 stores a set of tuning state 1520. The tuning state 1520 can take on several forms and in one embodiment can include similar data in a similar format as the prefetch tuning data 1510. In one embodiment the tuning state 1520 indicates a set of physical page numbers for which the normal training operation of the adaptive prefetch logic 1424 is to be modified. The tuning state 1520 can also indicate the prefetcher algorithms for which the tuning state 1520 is to be applied, as well as the effect of the tuning adaptation (e.g., exclude from training, aggressiveness adjustment, etc.).

The tuning state 1520 within the PTB 1422 is applied to algorithm training performed by the adaptive prefetcher 1420. The adaptive prefetch logic 1424, in one embodiment, includes a prefetcher selection module 1508 in communication with prefetcher algorithm logic 1511 and a prefetcher training module 1516. The prefetcher selection module 1508 may evaluate, at a given moment in time, which of multiple different prefetching algorithms within the prefetcher algorithm logic 1511 to apply to prefetch data. In one embodiment the prefetcher selection module 1508 evaluates candidate prefetcher algorithms for a given evaluation period using the prefetcher training module 1516 and compares the prefetch accuracies of those algorithms to thresholds 1512 defined for those algorithms. The thresholds 1512 establish candidate prefetcher performance that should be reached before prefetching is applied using a given prefetcher algorithm. The thresholds 1512 may be defined according to a category of prefetcher algorithms or a specific prefetcher algorithm. In one embodiment an algorithm hierarchy defines the relationships between prefetcher algorithms of the prefetcher algorithm logic 1511 such that prefetcher selection module 1508 can determine whether or not to evaluate a given prefetcher. For example, if a currently running prefetcher subsumes a candidate or newly activated prefetcher, the newly activated prefetcher is effectively deactivated or disregarded by prefetcher selection module 1508. In one embodiment the algorithm hierarchy 1514 causes the prefetcher selection module 1508 to deactivate less aggressive prefetchers that would fetch the same cache lines as a more aggressive prefetcher. However, this behavior can vary across embodiment. The selected prefetching algorithm can be used to perform prefetching operations by a prefetching action module 1526 or, in one embodiment, a branch prediction unit of a host processor of the adaptive prefetcher 1420.

In one embodiment the training process performed by the prefetcher training module 1516 is adjusted according to the tuning state 1520 stored in the PTB 1422. During training, the prefetcher training module 1516 can compare the physical page number of each evaluated physical address to page numbers stored in the tuning state 1520 within the PTB 1522 before the evaluated physical address is used to train the prefetchers. Where an entry in the tuning state 1520 is specific to a particular prefetcher algorithm, address training is tuned only for the specified prefetcher algorithm. The specific tuning can be specified within the tuning state 1520. For example, if an entry in the tuning state 1520 indicates that a physical page number should be excluded from training from the spatial prefetcher algorithm, any cache line requests that map to the physical page numbers marked for exclusion from the spatial prefetcher algorithm would be prevented from use for training. Likewise, cache line request marked for exclusion from the streamer prefetcher algorithm would be prevented from use for training. Alternatively, the tuning state 1520 can explicitly include a physical page number into the set of pages used for prefetcher algorithm training, for example, when a particular prefetcher algorithm is otherwise disabled. Additionally, the tuning state 1520 can specify a different prefetcher algorithm aggressiveness for one or more physical pages than otherwise specified for the algorithm.

FIG. 15B illustrates exemplary fields for the prefetch tuning data 1510 stored in the PTB 1422. The prefetch tuning data 1510 can be derived from data provided within an operand of the prefetch tuning instruction 1410 or a prefetcher command associated with the prefetch tuning instruction 1410.

The prefetch tuning data has multiple fields, the contents of which can vary among embodiments. In one embodiment, specific prefetcher algorithms or classes of prefetcher algorithms can be specified in, for example, a first field 1552, a second field 1554, and a third field 1556. A fourth field 1558 can indicate the physical page number to which the prefetcher algorithm tuning is to be applied. In one embodiment the first field 1552 can be used to indicate a 1-bit value that specifies that the physical page number specified in the fourth field 1558 is to be excluded from or included in training for the streamer prefetcher algorithm, depending on the configuration of the streamer prefetcher algorithm. Likewise, the second field 1554 can be used to indicate a 1-bit value that specifies the physical page number specified in the fourth field 1558 is to be excluded from or included in training for the spatial prefetcher algorithm. A third field 1556 can be used to indicate other prefetcher algorithms for which the physical page number specified by the fourth field 1558.

The size of each field can vary among embodiments. As illustrated, a 1-bit value is used for the first field 1552 and the second field 1554, which are associated with the streamer prefetcher algorithm and the spatial prefetcher algorithm respectively. An n-bit field is specified for the third field 1556, and can be used to specify a value to tune the aggressiveness of the associated prefetcher algorithm. In one embodiment the first field 1552 and the second field 1554 can also be defined as n-bit fields to enable tuning of the aggressiveness of the associated prefetcher algorithms. A 24-bit size is illustrated for the fourth field 1558 that specifies the physical page number, although the exact size can vary depending on the supported address size of the processor that includes the adaptive prefetcher 1420. In one embodiment, the physical page number can be specified as a vector of multiple page numbers to allow operation on more than one page with a single instruction.

Figure 16:
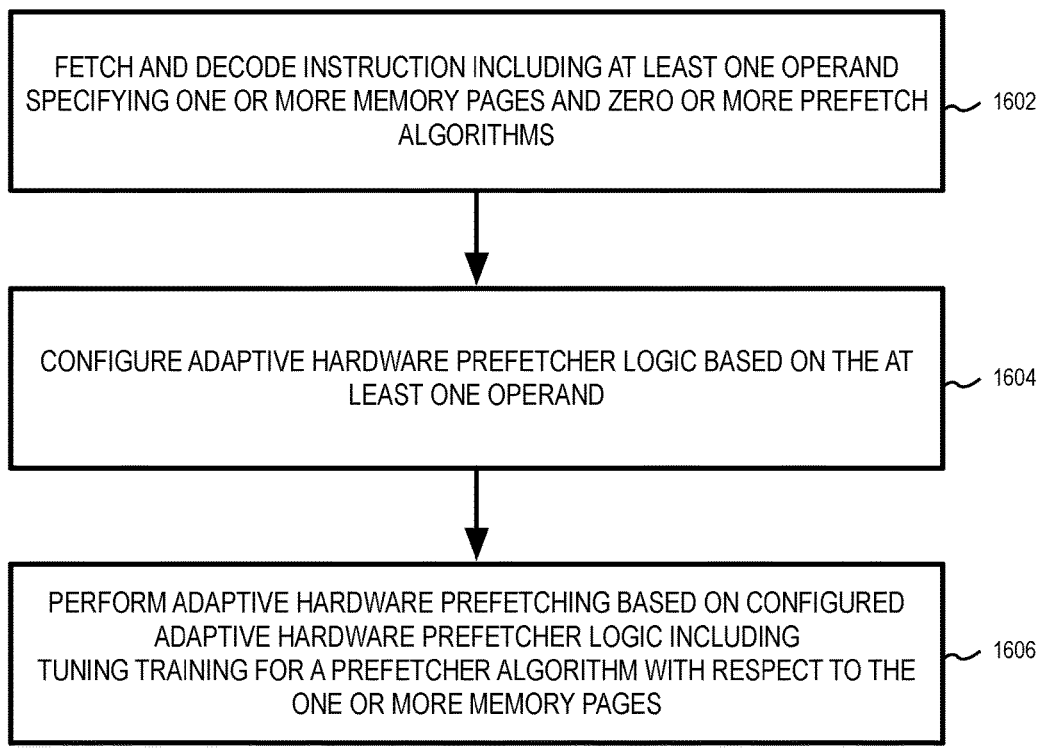
FIG. 16 is a flow diagram of processor logic to support software hints to improve hardware prefetcher effectiveness, according to an embodiment.

FIG. 16 is a flow diagram of processor logic 1600 to support software hints to improve hardware prefetcher effectiveness, according to an embodiment. The processor logic 1600 can be implemented within a processor core of the processor, where the processor includes fetch and decode logic as described herein. The processor logic 1600 can configure the fetch and decode logic to fetch and decode an instruction including at least one operand, as shown at 1602. The at least one operand can specify one or more memory pages and zero or more prefetcher algorithms. In one embodiment the at least one operand can be configured in a manner similar to the prefetch tuning data 1510 of FIG. 15B.

The processor logic 1600 can then configure adaptive hardware prefetcher logic based on the at least one operand, as shown at 1604. Configuring the adaptive hardware prefetcher logic can include relaying an instruction or sending a command to the adaptive prefetcher logic. The instruction or command can cause the adaptive hardware prefetcher to update a prefetch tuning buffer. In one embodiment the processor logic 1600 can send a unique prefetcher configuration command to configure the adaptive hardware prefetcher with prefetch tuning data. In one embodiment the processor logic 1600 can configure the adaptive hardware prefetcher via an overloaded prefetch command. For example, the processor logic 1600 can send an internal processor command to the prefetcher to explicitly prefetch from a specific pre-determined address or address range. The adaptive prefetcher can interpret the prefetch command from the specific pre-determined address or address range as a command to configure prefetch tuning for one or more physical page numbers encoded within the command. Alternatively, the explicit prefetcher command can be configured with additional bits that indicate that adaptive prefetcher algorithm training is to be tuned for a physical page associated with a specified address.

In one embodiment the prefetch tuning buffer can store data (e.g., tuning state 1520 as in FIG. 15A) to configure the manner in which prefetch tuning of one or more supported prefetcher algorithms is adapted for a listed physical page number. The specific adaptation can vary among embodiments. In one embodiment, the prefetch tuning buffer is configured as a prefetch exclusion buffer (PEB) that stores physical page numbers to be excluded from prefetcher algorithm training. In one embodiment the specific adaptation is configurable using a 1-bit value per prefetcher algorithm, in which prefetcher training for a given algorithm can be turned on or off for a given physical page number. In one embodiment the specific adaptation is configurable using an n-bit value per prefetcher algorithm, in which prefetcher training for a given algorithm can be turned on or off for a given page number and the aggressiveness of the prefetcher algorithm for a given page number can be tuned. The size of the physical page identified by the physical page number can vary depending on the configuration of the processor and/or the microarchitecture of the processor. The size of the address or identifier of the physical page can also vary according to processor configuration or microarchitecture. In one embodiment, up to 24-bits may be used to identify a physical page number for which prefetcher training is tuned or adapted.

Once the adaptive hardware prefetcher is configured at 1604, the processor logic 1600 can perform adaptive hardware prefetching based on the configured adaptive hardware prefetcher logic, as shown at 1606. Performing the adaptive hardware prefetching based on the configured adaptive hardware prefetcher can include tuning training for a prefetcher algorithm with respect to the one of more memory pages. Performing adaptive hardware prefetching based on the configured adaptive hardware prefetch logic can improve overall system performance in various ways. For example, the processor can avoid the over prefetching that would otherwise occur during workloads with inconsistent memory access patterns by excluding certain memory pages from prefetch training. Additionally, the processor can enable prefetcher algorithm training for certain memory pages when the prefetcher algorithm is disabled.

In one embodiment, adaptive prefetcher tuning can be used to avoid prefetcher demand throttling by certain cache memories. One or more of the cache memories described herein, such as, for example, the L2 cache 1406 of FIG. 14, can include a demand throttling mechanism that measures demand requests to pre-fetched cache lines. The L2 cache can then throttle the prefetcher when memory prefetches are not subsequently demand requested, which indicates that the prefetcher is currently polluting the L2 cache with unused data. In some workloads, demand throttling may be triggered when the processor operates on a non-prefetch friendly region of memory and subsequently miss prefetching opportunities that become available when the processor switches to a prefetch friendly region of memory. Adaptive prefetcher tuning can be used to configure the prefetcher to avoid training and prefetching from non-prefetch friendly regions of memory while enabling more aggressive prefetching for prefetch friendly regions of memory. Such configuration can improve overall system performance by reducing cache memory pollution and reducing the amount of extraneous data transmitted across internal and external memory busses of the processor and/or processing system.

Figure 17:
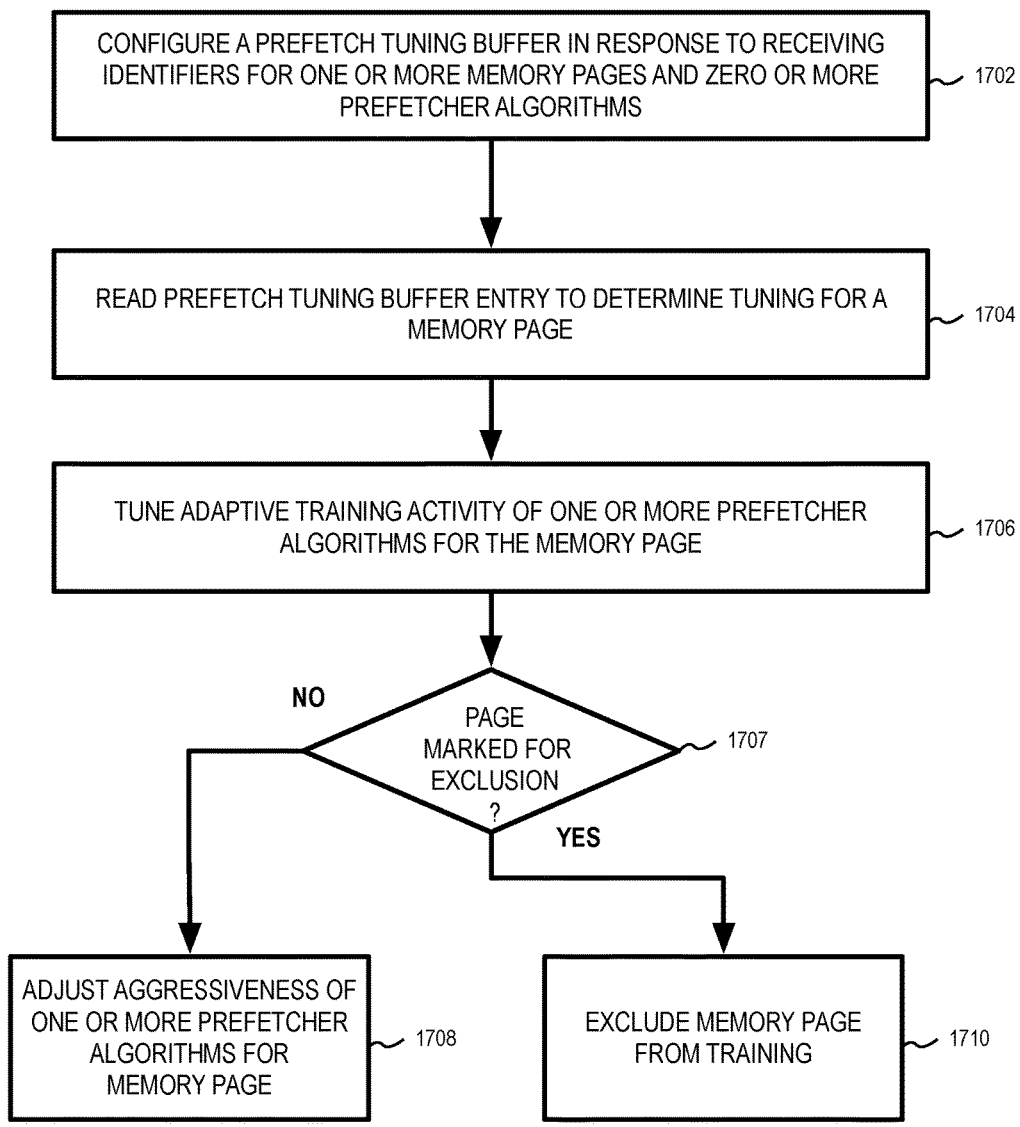
FIG. 17 is a flow diagram of prefetcher logic to configure adaptive training for a hardware prefetcher, according to an embodiment.

FIG. 17 is a flow diagram of prefetcher logic 1700 to configure adaptive training for a hardware prefetcher, according to an embodiment. The prefetcher logic 1700 can be included within an adaptive prefetcher, such as the adaptive prefetcher 1420 of FIG. 14 and FIG. 15A. In one embodiment the prefetcher logic 1700 can configure a prefetch tuning buffer with prefetch tuning data in response to receiving identifiers for one or more memory pages and zero or more prefetcher algorithms, as shown at 1702. In one embodiment a vector of multiple identifiers for multiple memory pages can be received. The memory page identifiers can be physical page numbers of a physical page of memory. Identifiers for one or more prefetcher algorithms can be specified or zero identifiers for the prefetcher algorithms can be specified. In the event zero identifiers are specified, the prefetcher logic 1700 can tune the training for all prefetcher algorithms within the adaptive prefetcher.

The prefetcher logic 1700 can then read a prefetch tuning buffer entry from the prefetch tuning buffer to determine a specific tuning for one or more memory pages during prefetcher algorithm training, as shown at 1704. The data read from the prefetch tuning buffer entry can be used by the prefetcher logic 1700 to tune adaptive training activity for one or more prefetcher algorithms for one or more memory pages specified in the entry, as shown at 1706. The specific tuning can be any of the tunings described herein, including exclusion, inclusion, or aggressiveness tuning with respect to the training for one or more prefetcher algorithms.

An example of the operations to determine a type of tuning can is shown at 1707, in which the prefetcher logic 1700 can determine if the prefetcher tuning buffer entry indicates that a memory page is marked for exclusion. If the memory page is marked for exclusion at 1707, the prefetcher logic 1700 can exclude a memory page from training, as shown at 1710. Alternatively, if the page is not marked for exclusion at 1707, the prefetcher logic 1700 can include the memory page for training, including adjusting the aggressiveness of one or more prefetcher algorithms for the memory page, as shown at 1708.

Figure 18:
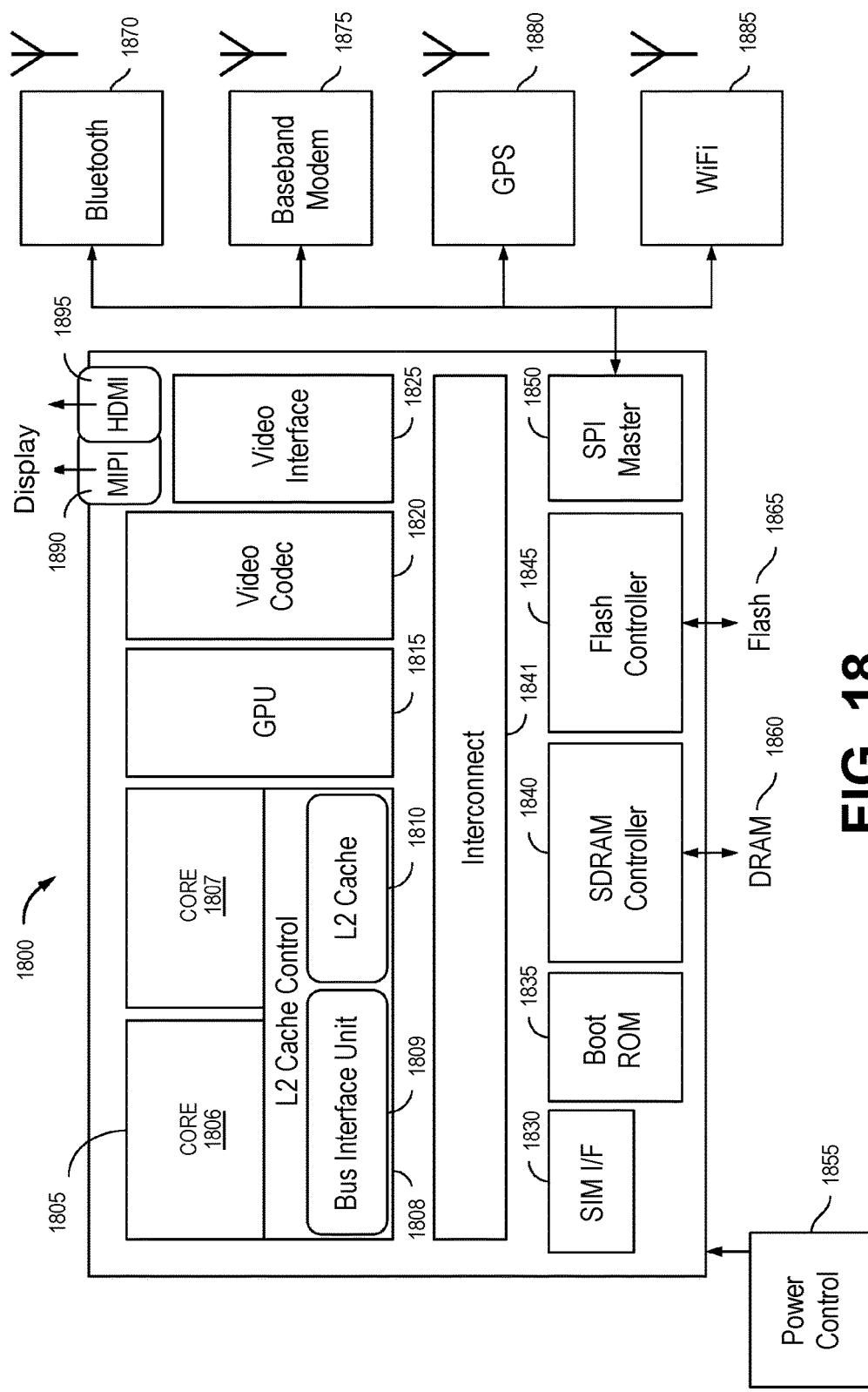
FIG. 18 is a block diagram of a processing system according to embodiments described herein.

FIG. 18 is a block diagram of a processing system 1800 according to embodiments described herein. The processing system 1800 may include any number of components suitable for enabling embodiments described herein. For example, the processing system 1800 may include processing entities such a general-purpose processor 1805 including as one or more processor cores (e.g., cores 1806, 1807) and at least one graphics processing unit (e.g., GPU 1815). The cores 1806, 1807 may be communicatively coupled to the rest of processing system 1800 through any suitable mechanism, such as through a bus or cache. In one embodiment, the cores 1806, 1807 may be communicatively coupled through an L2 cache control 1808, which may include a bus interface unit 1809 and an L2 cache 1810. The cores 1806, 1807 and GPU 1815 may be communicatively coupled to each other and to the remainder of the processing system 1800 through an interconnect 1841. In one embodiment the GPU 1815 may couple with a video codec 1820 that defines the manner in which particular video signals will be encoded and decoded for output.

The processing system 1800 may also include any number or kind of interfaces, controllers, or other mechanisms for interfacing or communicating with other portions of an electronic device or system. Such mechanisms may facilitate interaction with, for example, peripherals, communications devices, other processors, or memory. For example, the processing system 1800 may include a video interface 1825, a subscriber interface module (SIM) interface 1830, a boot ROM interface 1835, a synchronous dynamic random access memory (SDRAM) controller 1840, a flash controller 1845, and a serial peripheral interface (SPI) master unit 1850. The video interface 1825 may provide output of video signals from, for example, GPU 1815 and through, for example, a mobile industry processor interface (MIPI) 1890 or a high-definition multimedia interface (HDMI) 1895 to a display. Such a display may include, for example, an LCD or LED based display. SIM interface 1830 may provide access to or from a SIM card or device. SDRAM controller 1840 may provide access to or from memory (e.g., DRAM 1860) such as an SDRAM chip or module. Flash controller 1845 may provide access to or from memory such as flash memory 1865 or other instances of RAM. SPI master unit 1850 may provide access to or from communications modules, such as a Bluetooth module 1870, high-speed 3G modem 1875, global positioning system module 1880, or wireless module 1885 implementing a communications standard such as 802.11. Additionally, a power control unit 1855 can be used to manage an overall and individualized power state for components of the processing system 1800.

The following clauses and/or examples pertain to specific embodiments or examples thereof. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system according to embodiments and examples described herein. Various components can be a means for performing the operations or functions described.

One embodiment provides for a processor comprising a cache, a prefetcher module to select information according to a prefetcher algorithm and to send the information selected to the cache, and a prefetch tuning buffer including tuning state for a set of candidate prefetcher algorithms, wherein the prefetcher module is to adjust operation of the prefetcher algorithm based on the tuning state. In one embodiment the prefetcher module includes logic to configure the prefetch tuning buffer in response to receipt of an identifier for one or more memory pages. In one embodiment the processor additionally includes a prefetcher algorithm selection module to select the prefetcher algorithm from a set of candidate prefetcher algorithms. The prefetcher algorithm selection module can adjust selection of the prefetcher algorithm based on the tuning state, where the tuning state includes data to tune training of the set of candidate prefetcher algorithms.

One embodiment provides for a machine-readable medium having stored thereon data, which if performed by at least one machine, causes the at least one machine to fabricate at least one integrated circuit to perform a method comprising fetching and decoding an instruction including at least one operand specifying one or more memory pages, configuring adaptive hardware prefetcher logic based on the at least one operand, and performing adaptive hardware prefetching based on the adaptive hardware prefetcher logic, wherein performing adaptive hardware prefetching includes tuning training for a prefetcher algorithm of the adaptive hardware prefetcher logic with respect to the one or more memory pages. In one embodiment, configuring the adaptive hardware prefetcher logic includes configuring a prefetch tuning buffer in response to receiving identifiers for the one or more memory pages, where the identifiers for the one or more memory pages are received via the at least one operand. Tuning training for a prefetcher algorithm can include reading an entry in the prefetch tuning buffer to determine a tuning to apply for a memory page.

Thus, techniques for performing one or more instructions according to at least one embodiment are disclosed. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:
1. A processor comprising:
a cache;
a prefetcher coupled to the cache to receive a prefetch tuning instruction comprising data identifying one or more memory, a first tuning state that indicates an adjustment of an operation of a first prefetcher algorithm for the one or more memory pages and a second tuning state that indicates an adjustment of an operation of a second prefetcher algorithm for the one or more memory pages, wherein the prefetcher is configured to select information according to the prefetcher algorithm and to send the information selected to the cache; and a prefetch tuning buffer to store the tuning state, wherein the prefetcher is to adjust the operation of the prefetcher algorithm for the one or more memory pages based on the tuning state.

2. The processor as in claim 1, the prefetcher including logic to configure the prefetch tuning buffer in response to receipt of an identifier for one or more memory pages.

3. The processor as in claim 2, wherein the first tuning state identifies the adjustment for the operation of the prefetcher using the first prefetcher algorithm for the one or more memory pages.

4. The processor as in claim 2, wherein the prefetcher is to adjust operation of the first prefetcher algorithm for the one or more memory pages identified by the first tuning state.

5. The processor as in claim 4, the prefetcher is to adjust operation of the first prefetcher algorithm by configuring the first prefetcher algorithm to exclude the one or more memory pages from training for the first prefetcher algorithm.

6. The processor as in claim 4, the prefetcher is to adjust operation of the first prefetcher algorithm by configuring the first prefetcher algorithm to include the one or more memory pages in training for the first prefetcher algorithm.

7. The processor as in claim 4, the prefetcher is to adjust operation of the first prefetcher algorithm by configuring the first prefetcher algorithm to adjust aggressiveness of the first prefetcher algorithm for the one or more memory pages.

8. The processor as in claim 7, wherein to adjust the aggressiveness of the first prefetcher algorithm for the one or more memory pages includes to adjust one or more of a prefetch distance and a prefetch degree for the first prefetcher algorithm.

9. The processor as in claim 1, additionally comprising a prefetcher algorithm selector to select the first prefetcher algorithm from a set of candidate prefetcher algorithms.

10. The processor as in claim 9, wherein the prefetcher algorithm selector is to adjust selection of the first prefetcher algorithm based on the first tuning state, the first tuning state including data to tune training of the first prefetcher algorithm.

11. A non-transitory machine-readable medium storing executable program instructions, which when executed by a data processing system, cause the data processing system to perform operations comprising:

fetching and decoding an instruction including at least one operand specifying one or more memory pages, a first tuning state that indicates an adjustment of an operation of a first prefetcher algorithm for the one or more memory pages and a second tuning state that indicates an adjustment of an operation of a second prefetcher algorithm for the one or more memory pages;

configuring an adaptive hardware prefetcher logic based on the at least one operand; and performing adaptive hardware prefetching based on the adaptive hardware prefetcher logic, wherein performing adaptive hardware prefetching includes tuning training for the prefetcher algorithm of the adaptive hardware prefetcher logic with respect to the one or more memory pages based on the tuning state.

12. The non-transitory machine-readable medium as in claim 11, wherein configuring the adaptive hardware prefetcher logic includes configuring a prefetch tuning buffer in response to receiving identifiers for the one or more memory pages, the identifiers for the one or more memory pages received via the at least one operand.

13. The non-transitory machine-readable medium as in claim 12, wherein tuning training for the first prefetcher algorithm of the adaptive hardware prefetcher logic includes reading an entry in the prefetch tuning buffer to determine a tuning to apply for a memory page.

14. The non-transitory machine-readable medium as in claim 13, wherein the tuning to apply for the memory page includes excluding the memory page from training for the first prefetcher algorithm.

15. The non-transitory machine-readable medium as in claim 13, wherein the tuning to apply for the memory page includes including the memory page in training for the first prefetcher algorithm or adjusting an aggressiveness of the first prefetcher algorithm with respect to the memory page.

16. A method comprising:

fetching and decoding an instruction including at least one operand specifying one or more memory pages, a first tuning state that indicates an adjustment of an operation of a first prefetcher algorithm for the one or more memory pages and a second tuning state that indicates an adjustment of an operation of a second prefetcher algorithm for the one or more memory pages;

executing the instruction, wherein executing the instruction includes configuring an adaptive hardware prefetcher logic based on the at least one operand; and performing adaptive hardware prefetching based on the adaptive hardware prefetcher logic, wherein performing adaptive hardware prefetching includes tuning training for the prefetcher algorithm of the adaptive hardware prefetcher logic with respect to the one or more memory pages based on the tuning state.

17. The method as in claim 16, wherein configuring the adaptive hardware prefetcher logic includes configuring a prefetch tuning buffer in response to receiving identifiers for the one or more memory pages, the identifiers for the one or more memory pages received via the at least one operand.

18. The method in as in claim 17, wherein tuning training for the first prefetcher algorithm of the adaptive hardware prefetcher logic includes reading an entry in the prefetch tuning buffer to determine a tuning to apply for a memory page.

19. The method as in claim 18, wherein the tuning to apply for the memory page includes excluding the memory page from training for the first prefetcher algorithm.

20. The method as in claim 18, wherein the tuning to apply for the memory page includes including the memory page in training for the first prefetcher algorithm or adjusting an aggressiveness of the first prefetcher algorithm with respect to the memory page.

* * * * *